B. W. TUCKER & L. H. ARNOLD.
BRUSH MAKING MACHINE.
APPLICATION FILED MAY 21, 1915.
1,240,516.
Patented Sept. 18, 1917.
30 SHEETS—SHEET 7.
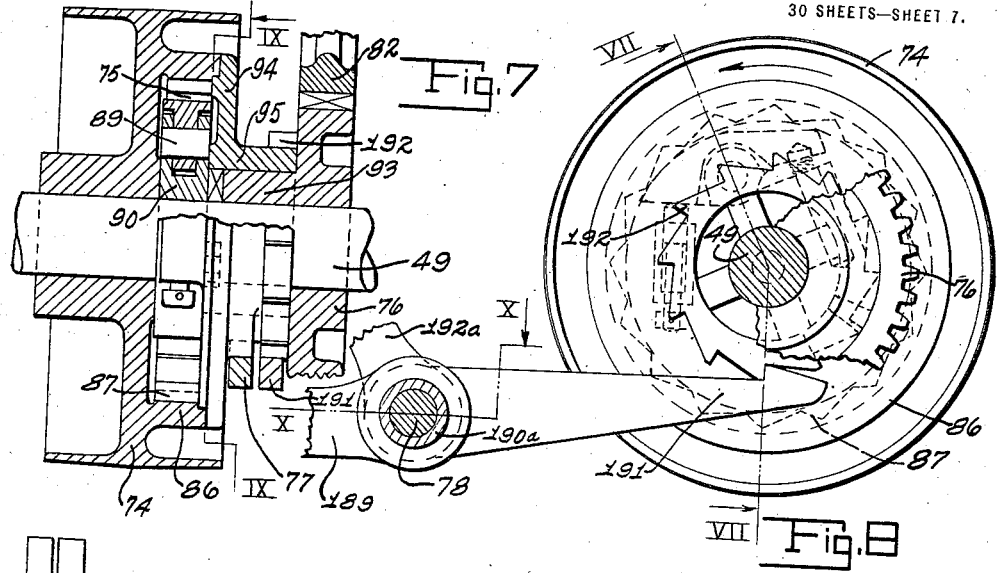
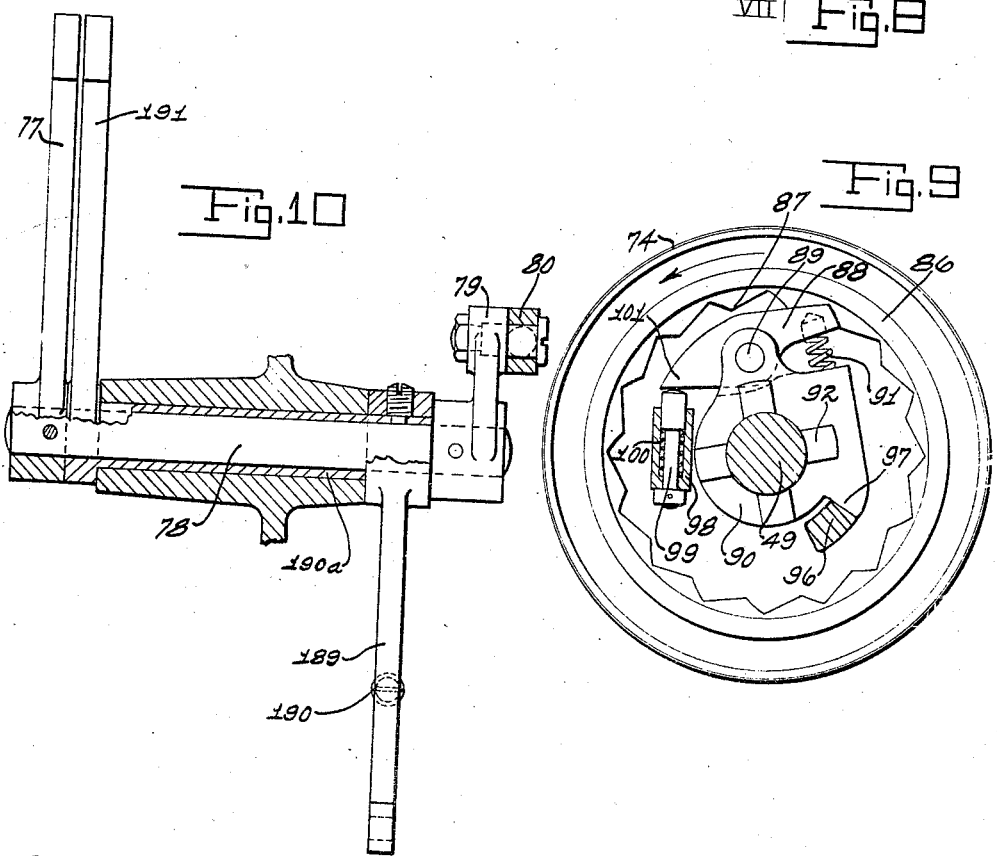
Witnesses:
Inventors
B. W. Tucker
L. H. Arnold
By their Attorneys

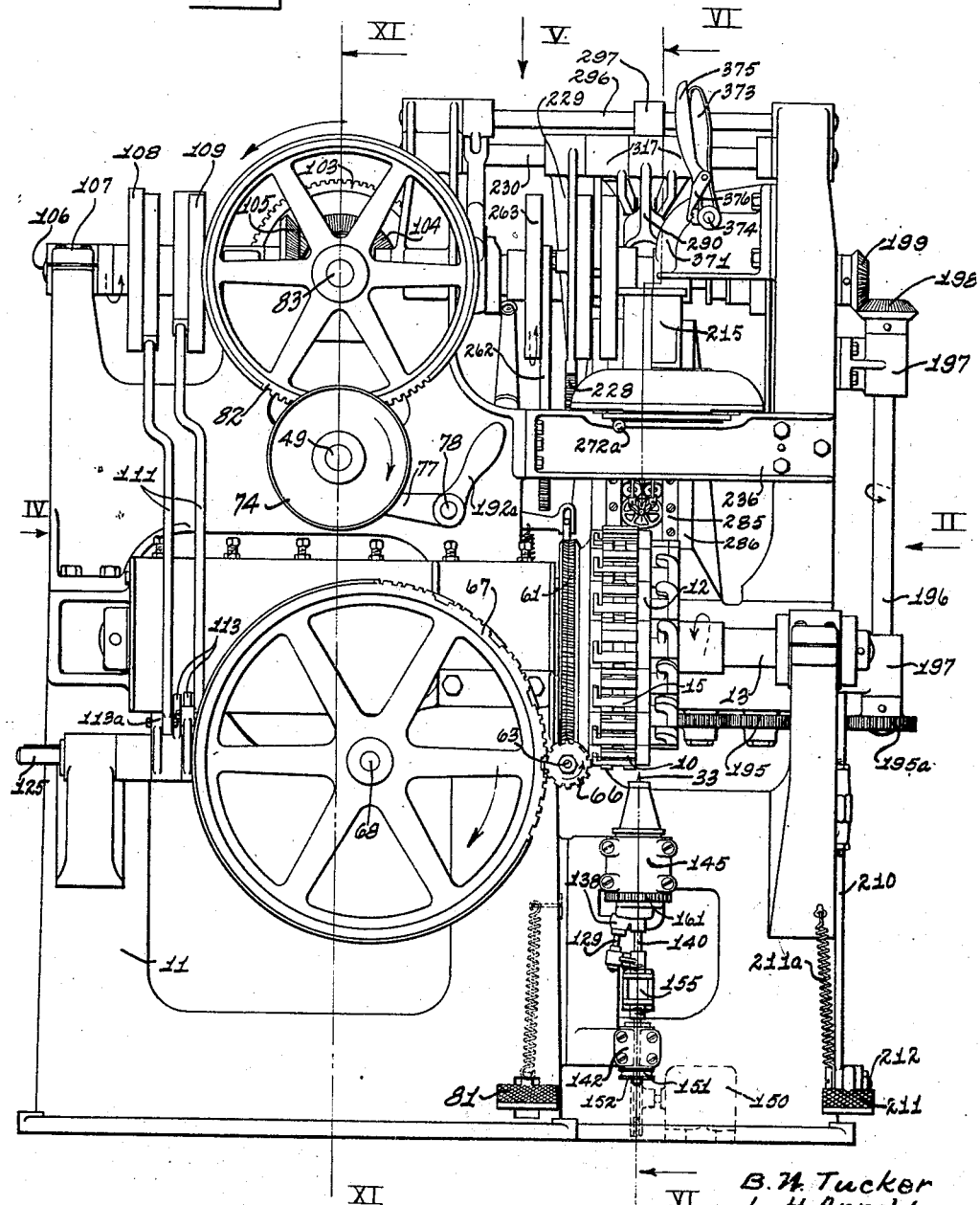

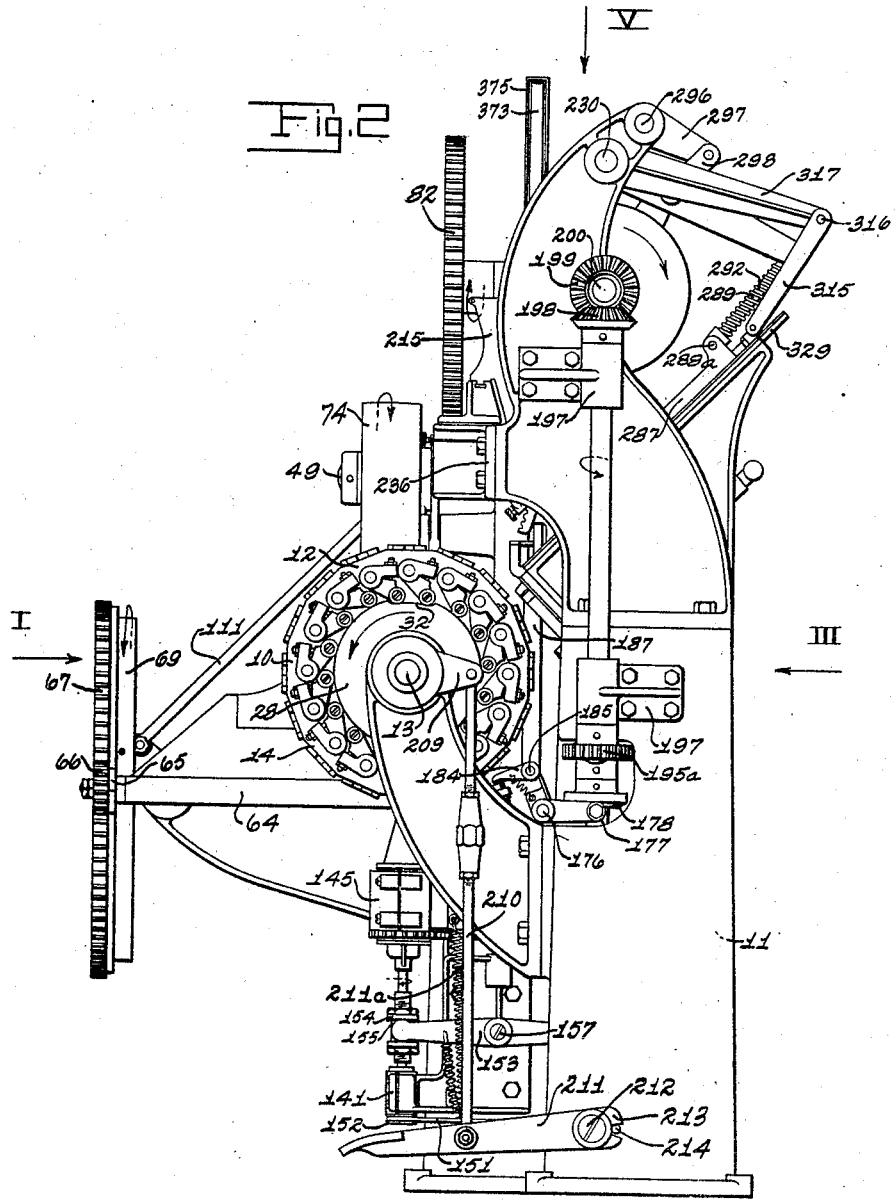

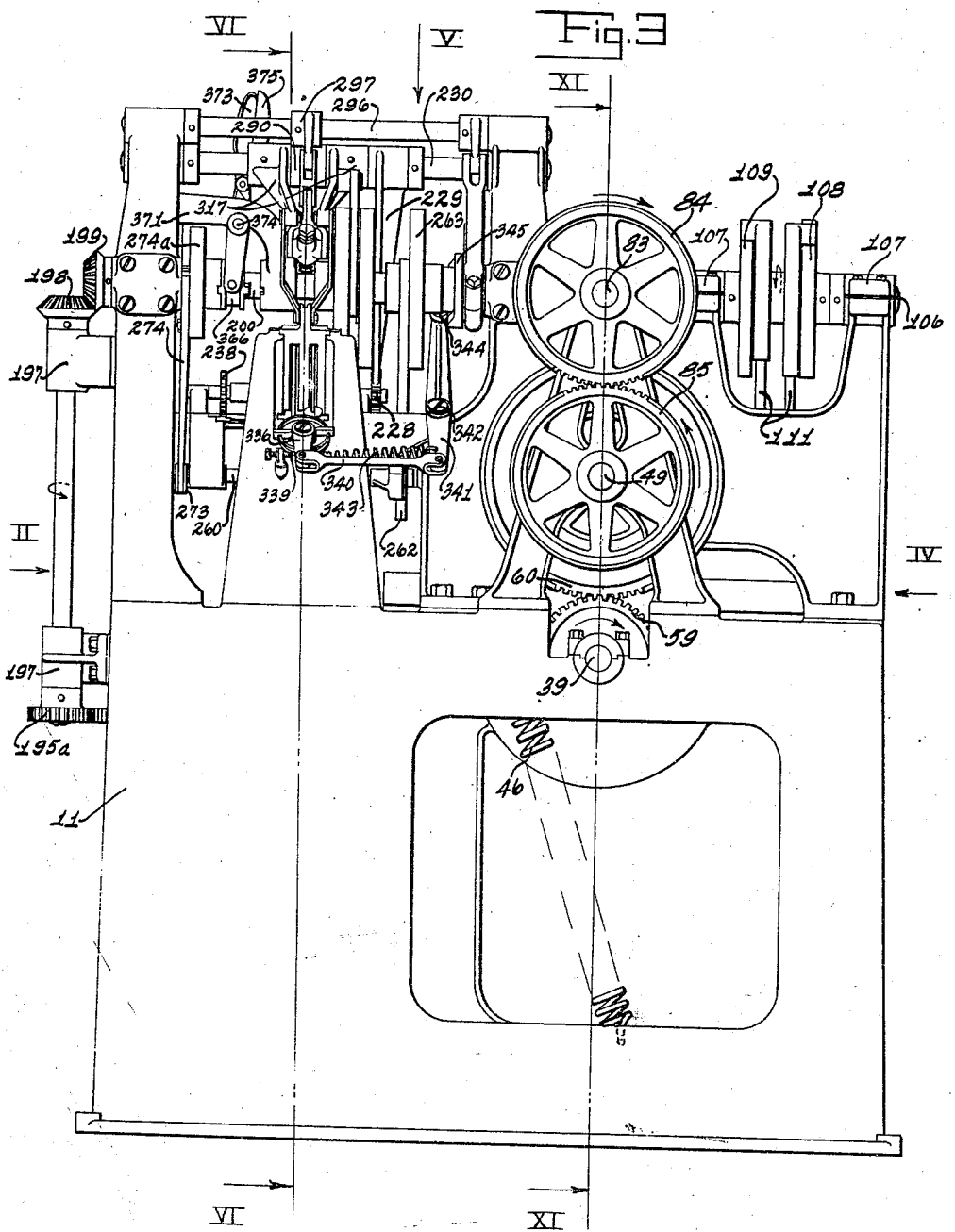

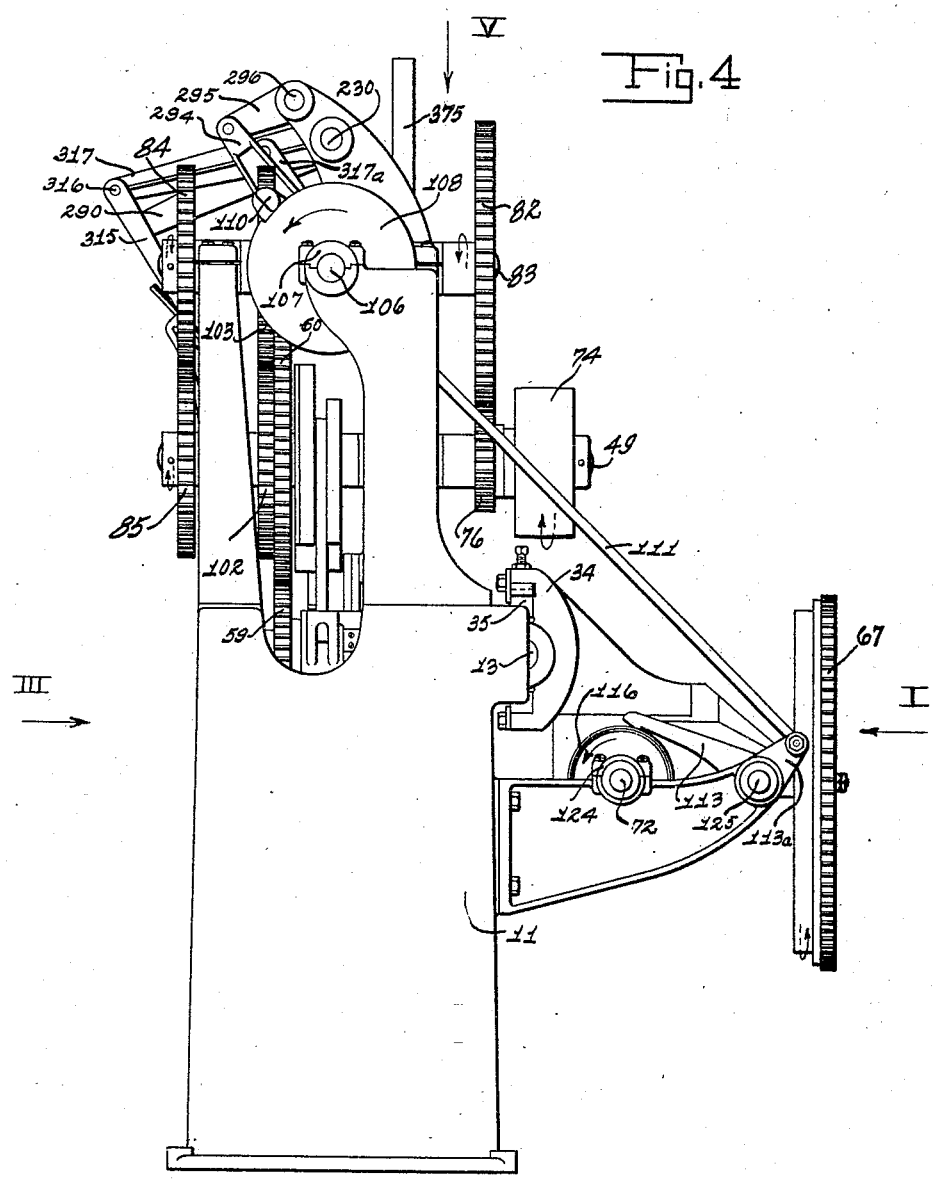

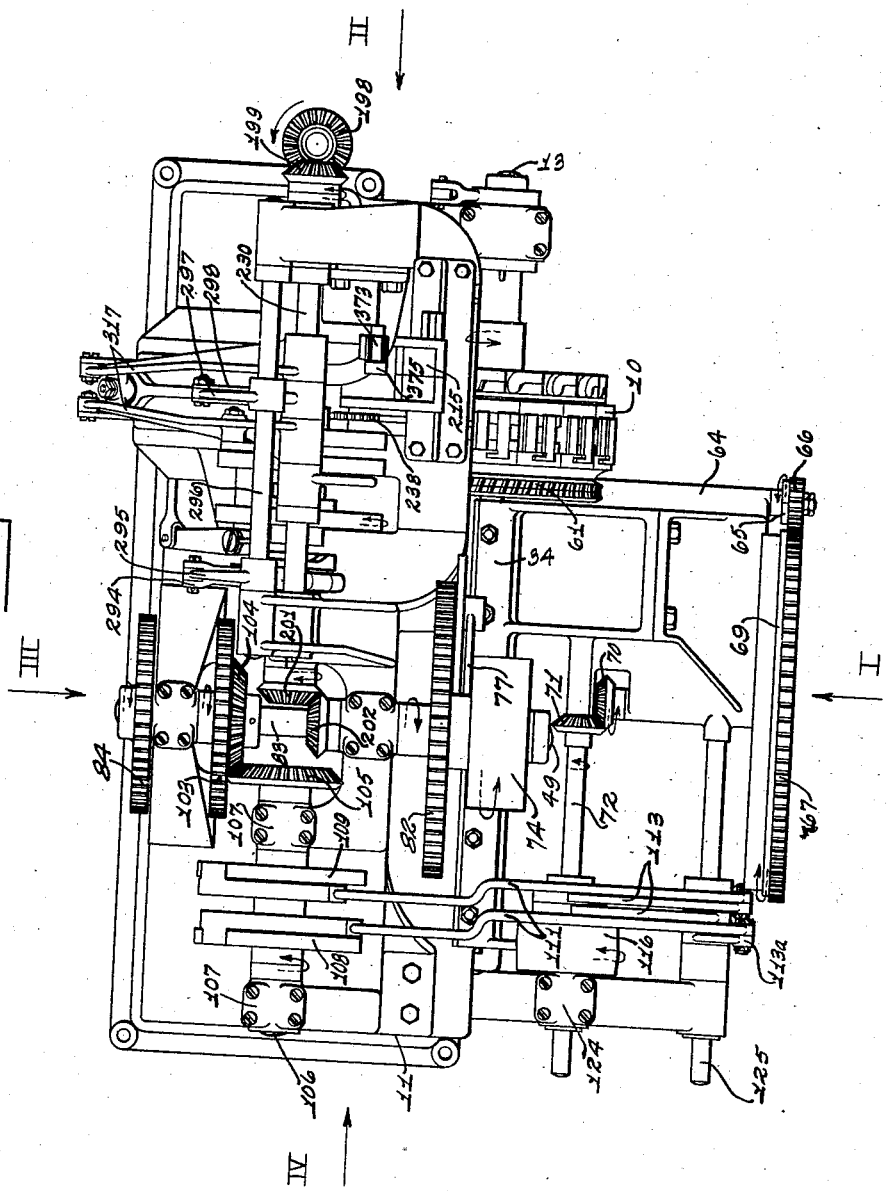

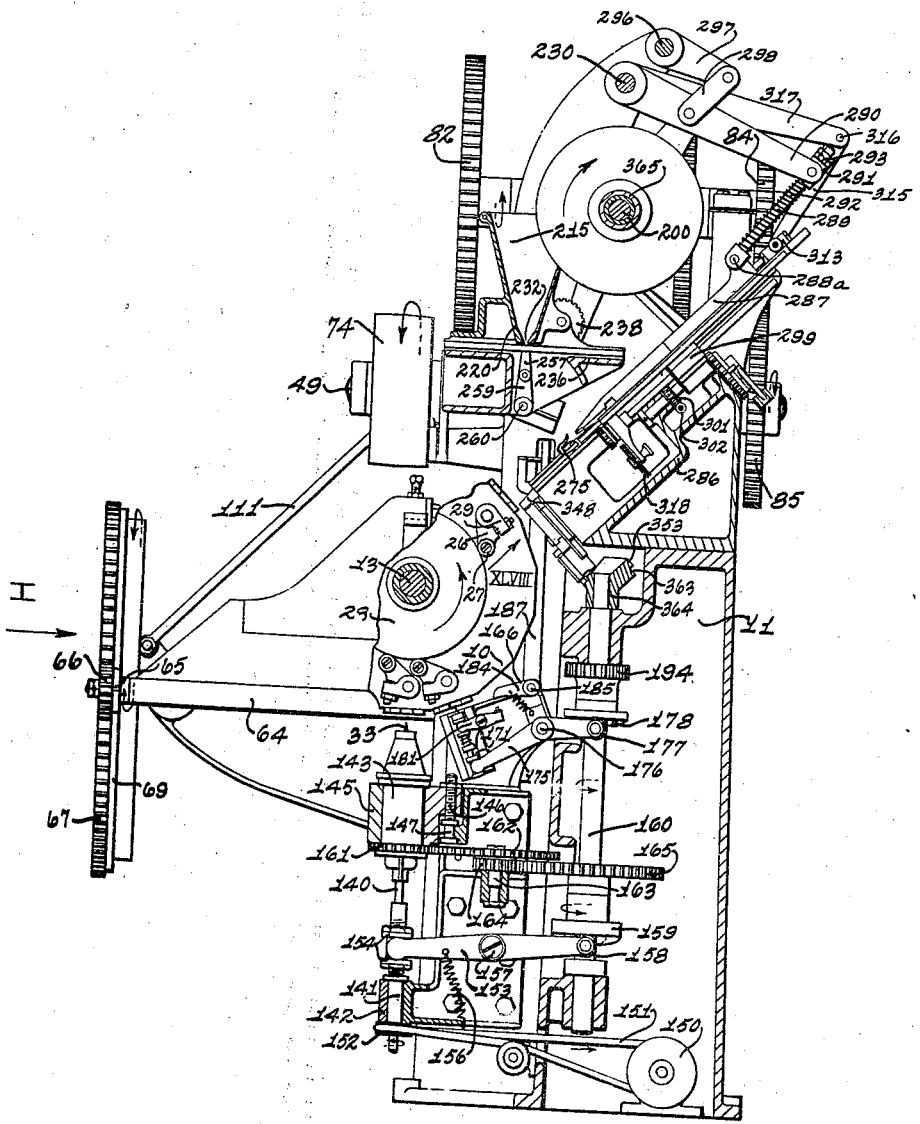

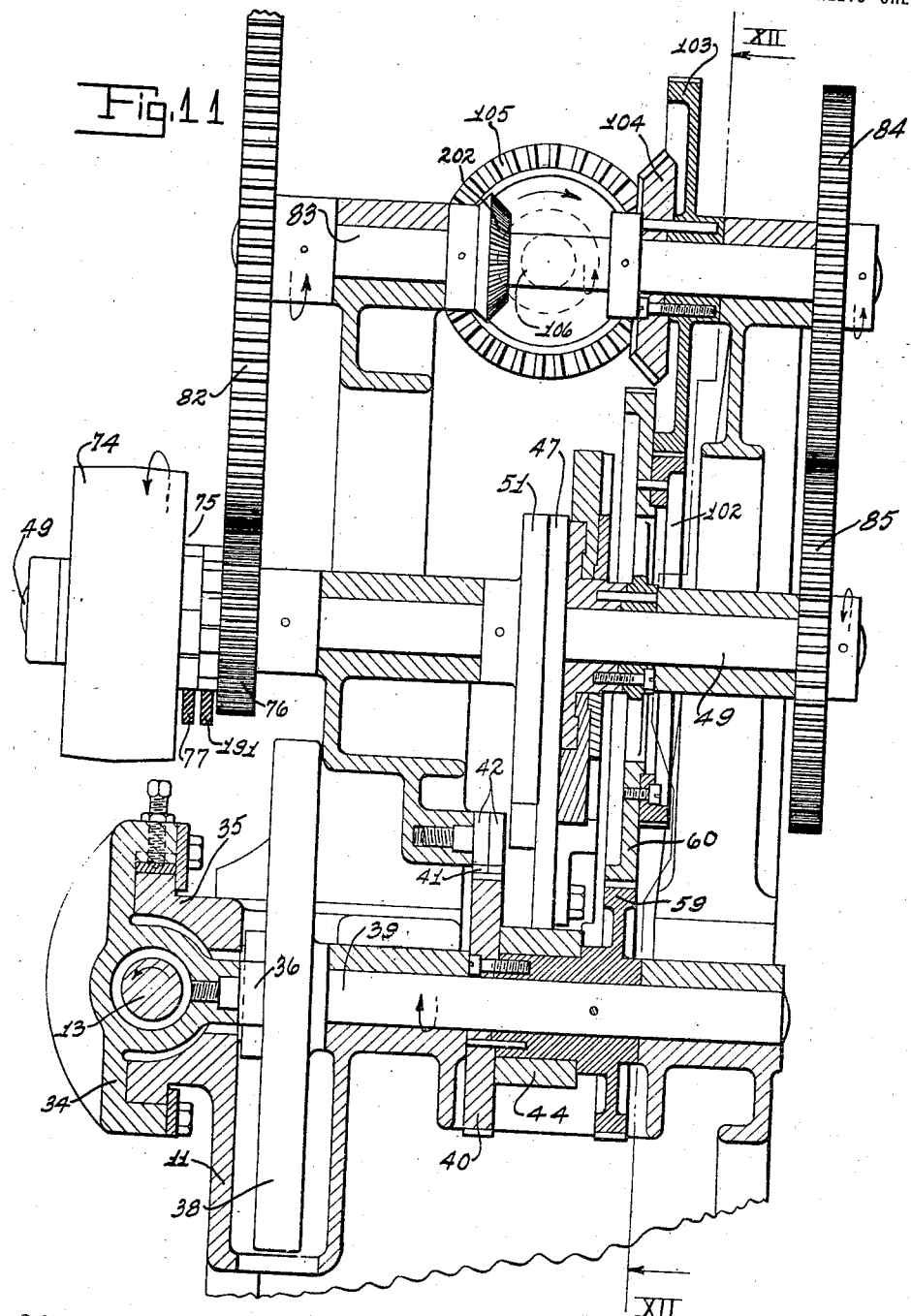

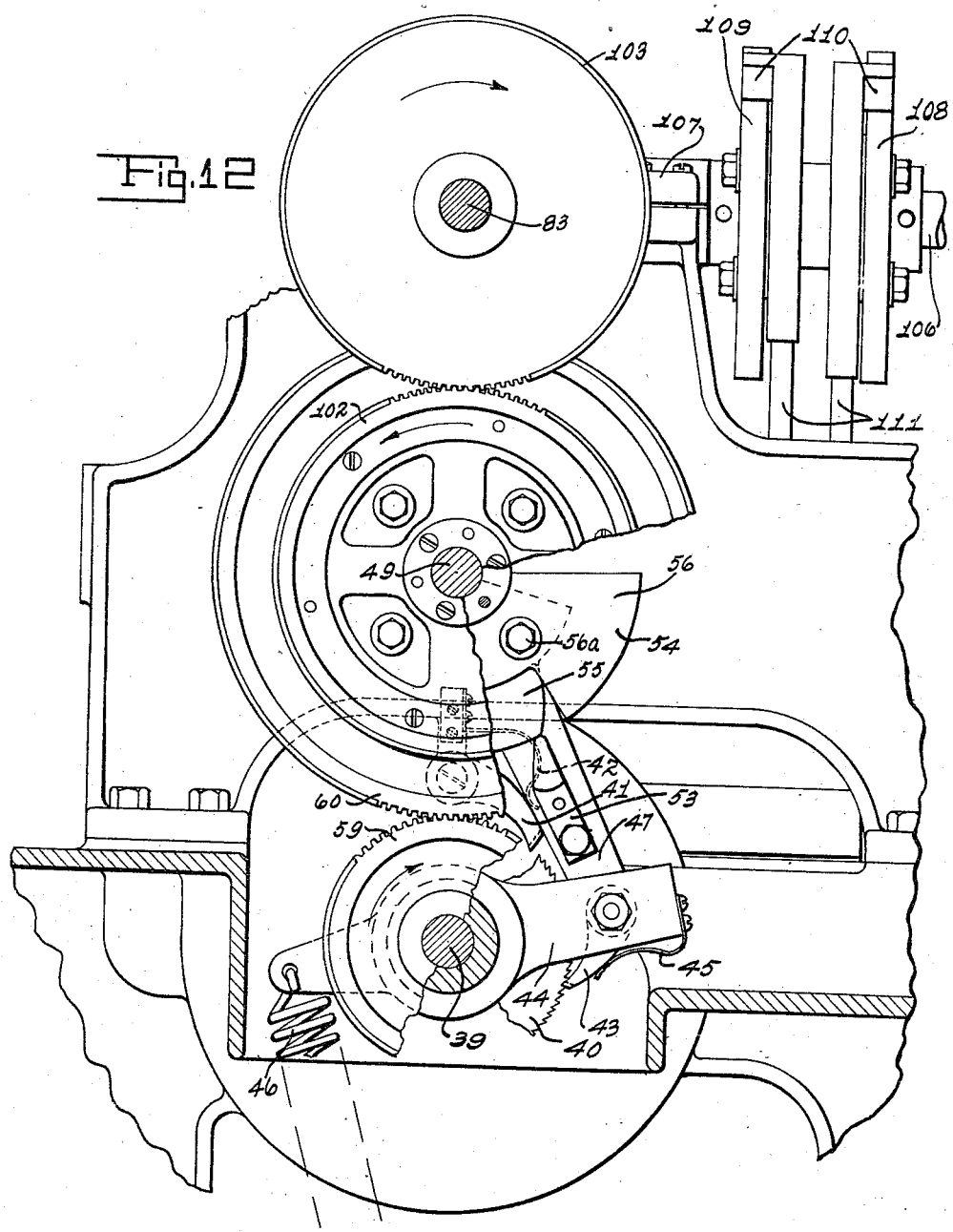

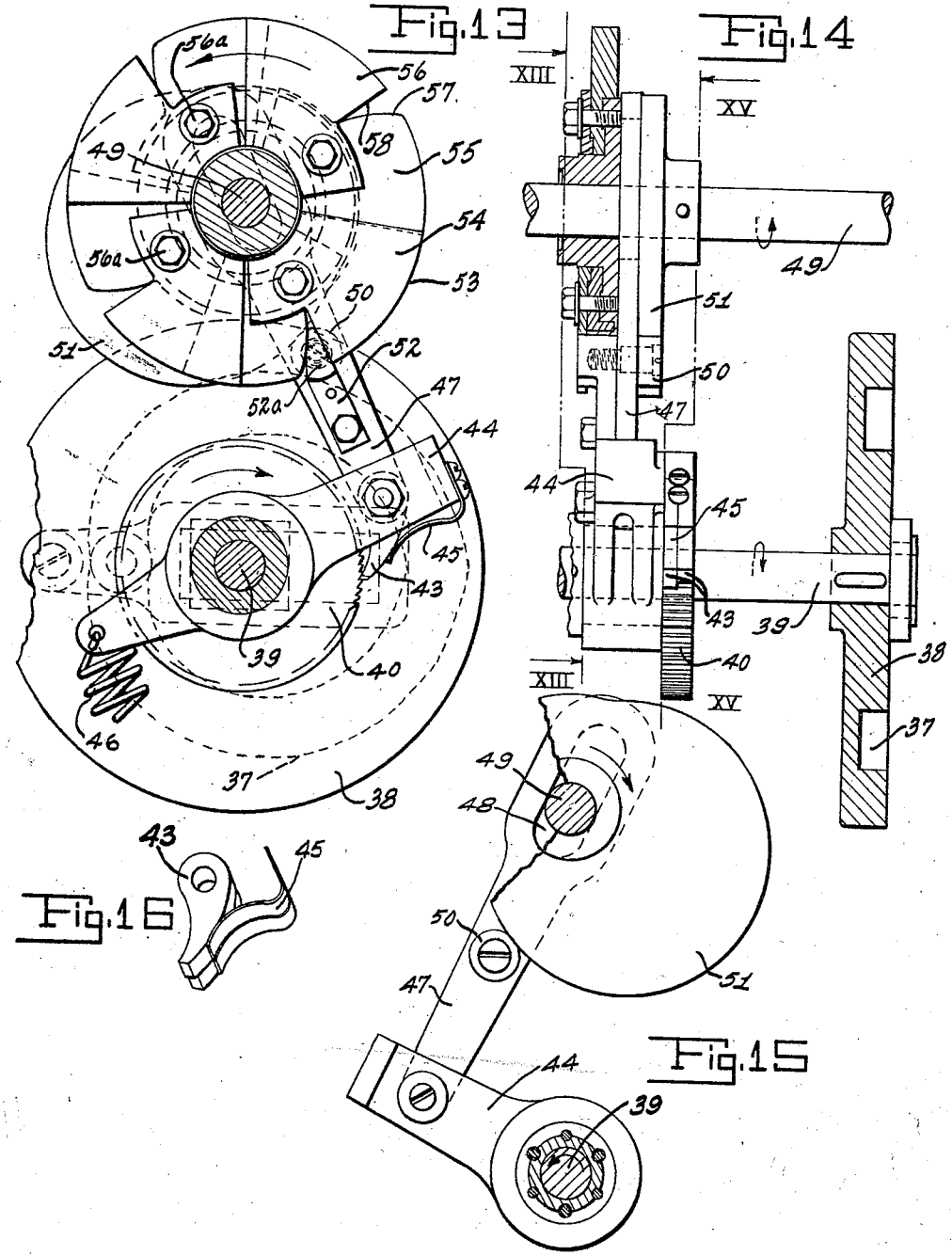

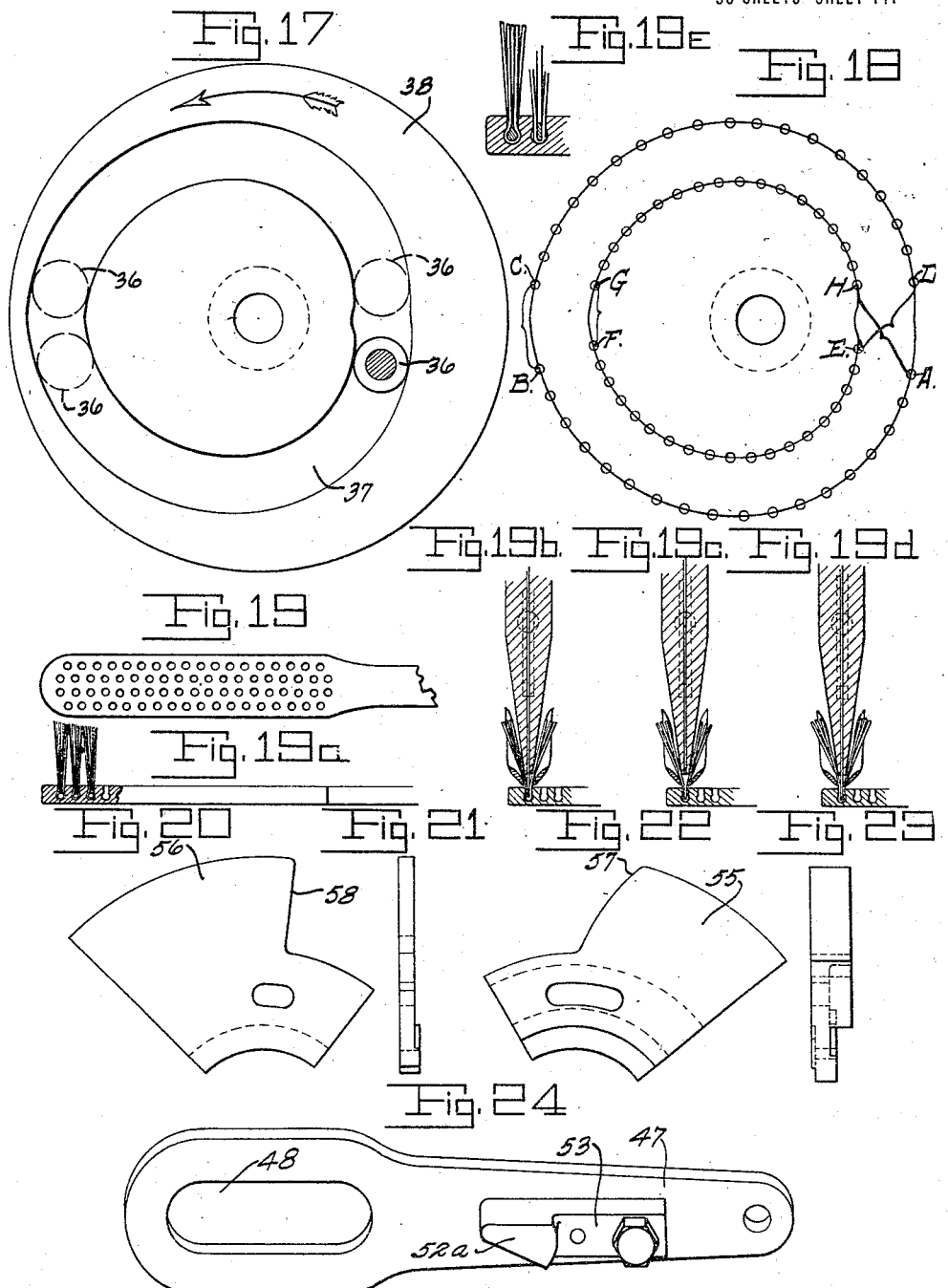

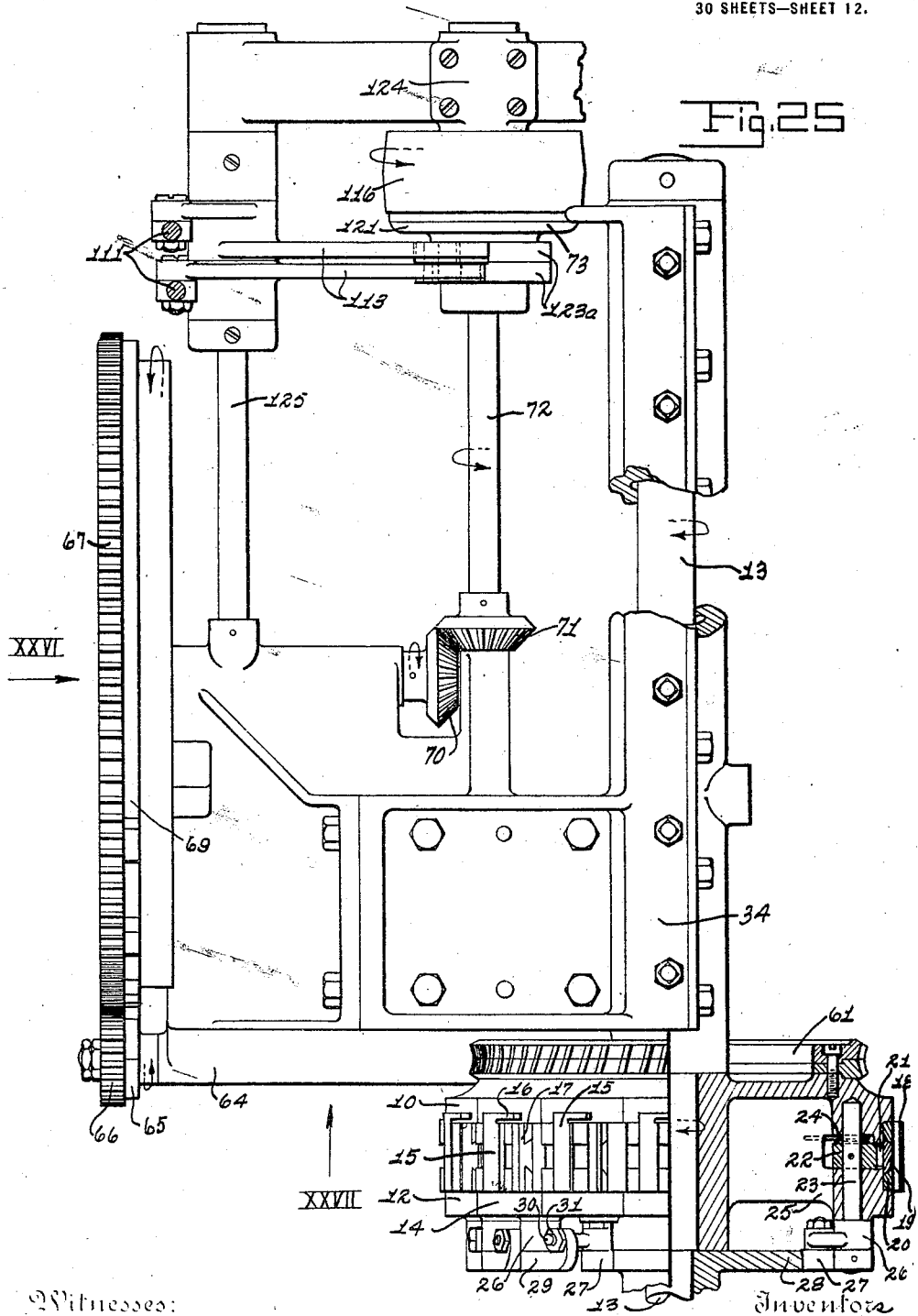

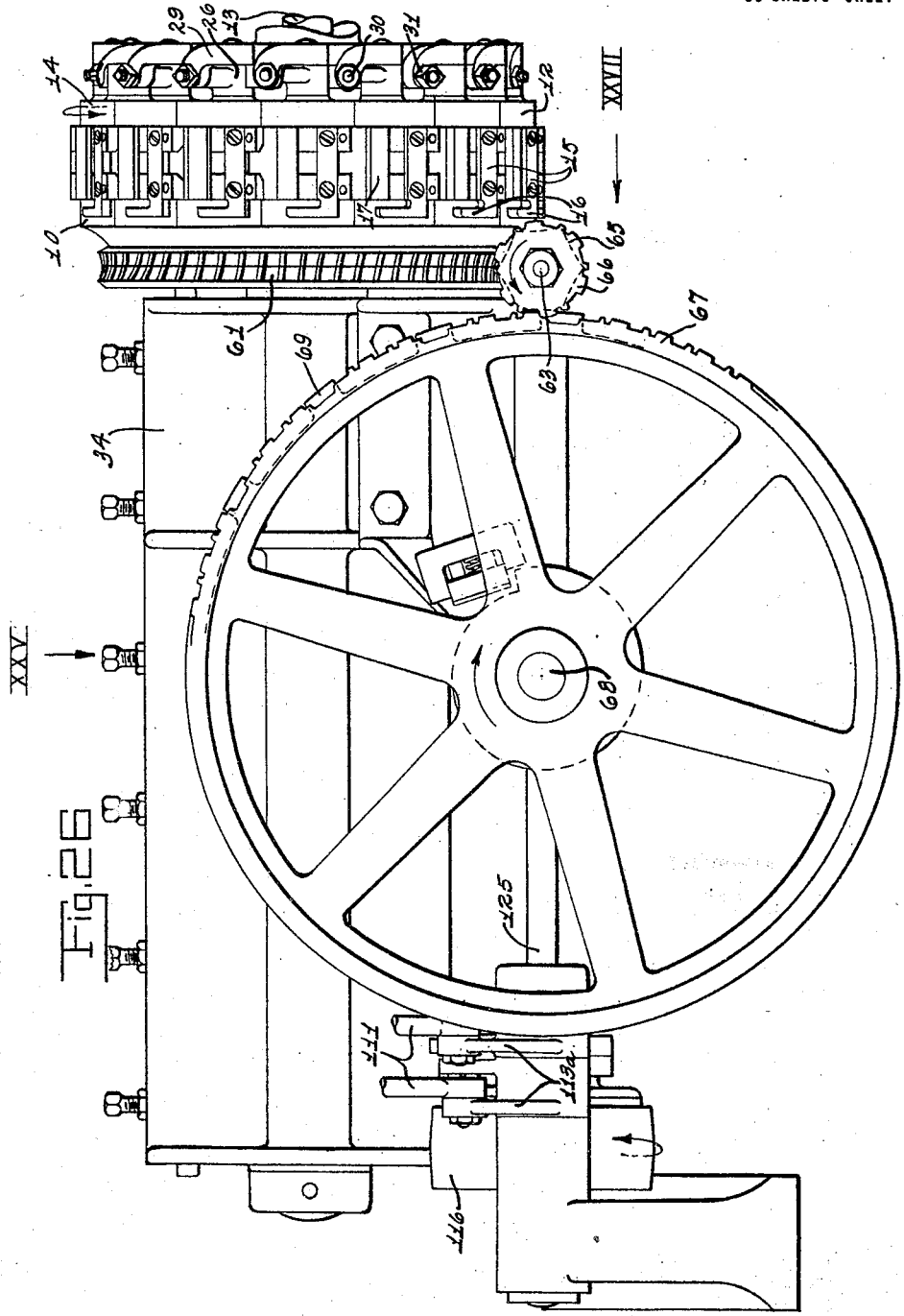

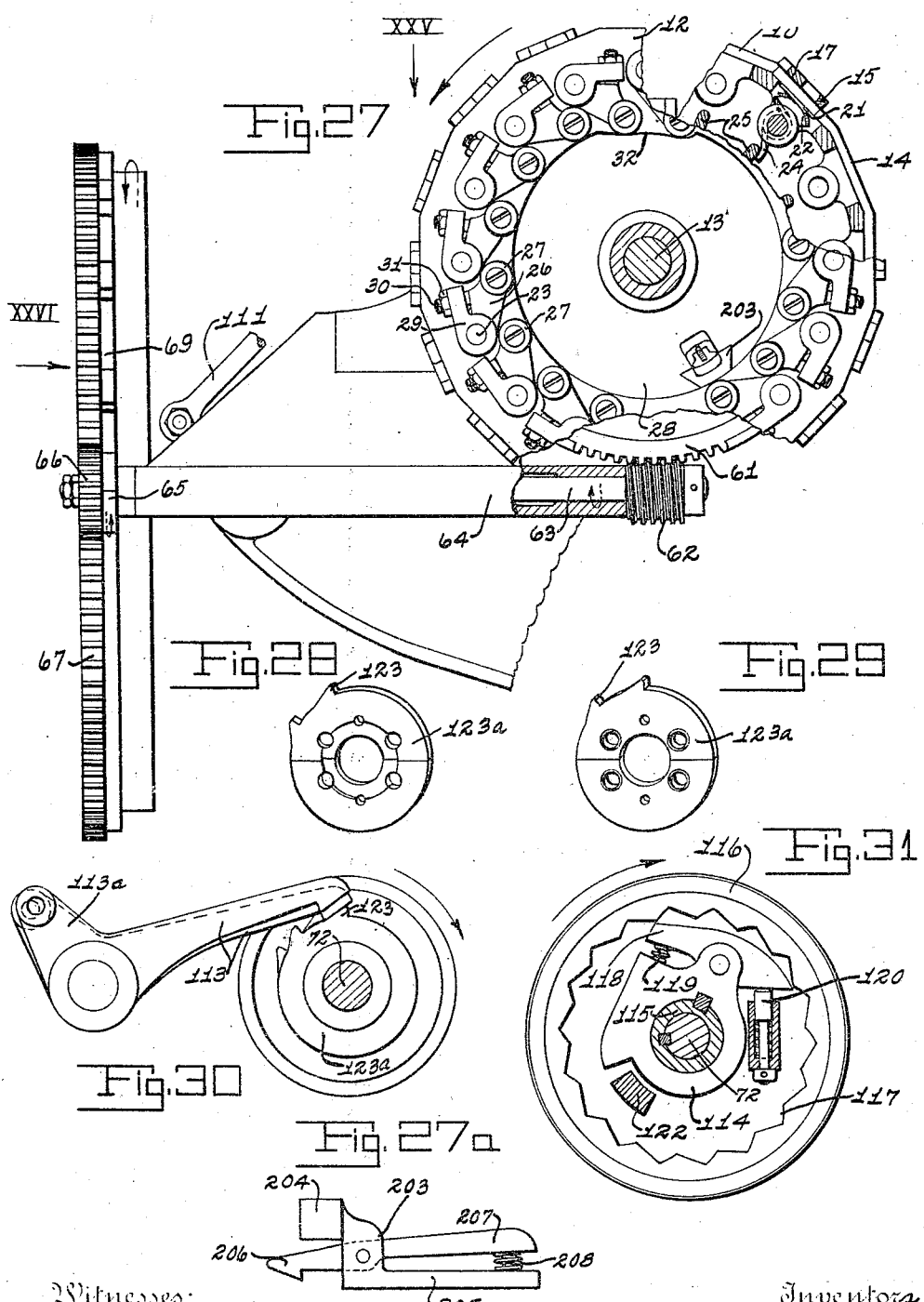

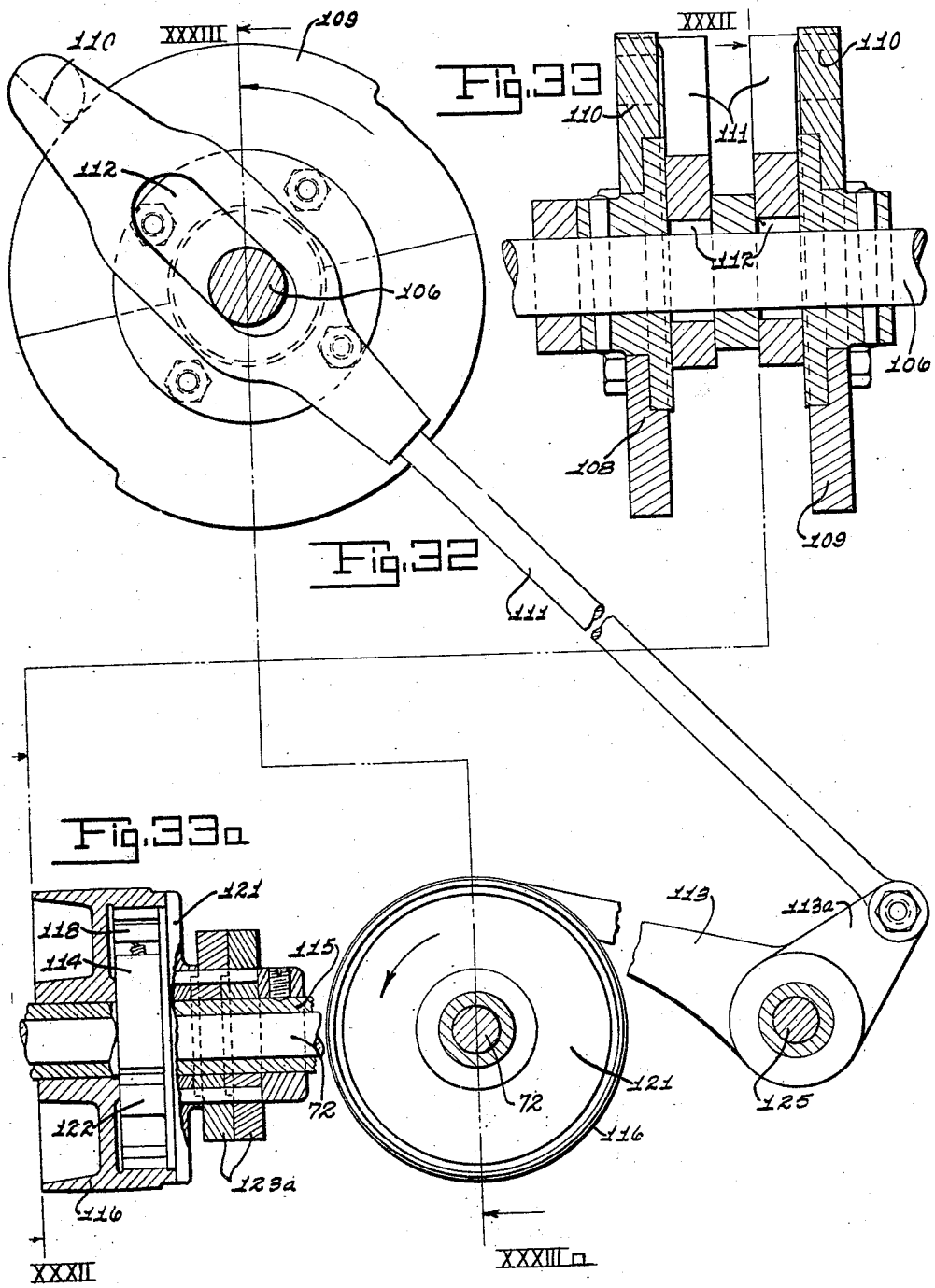

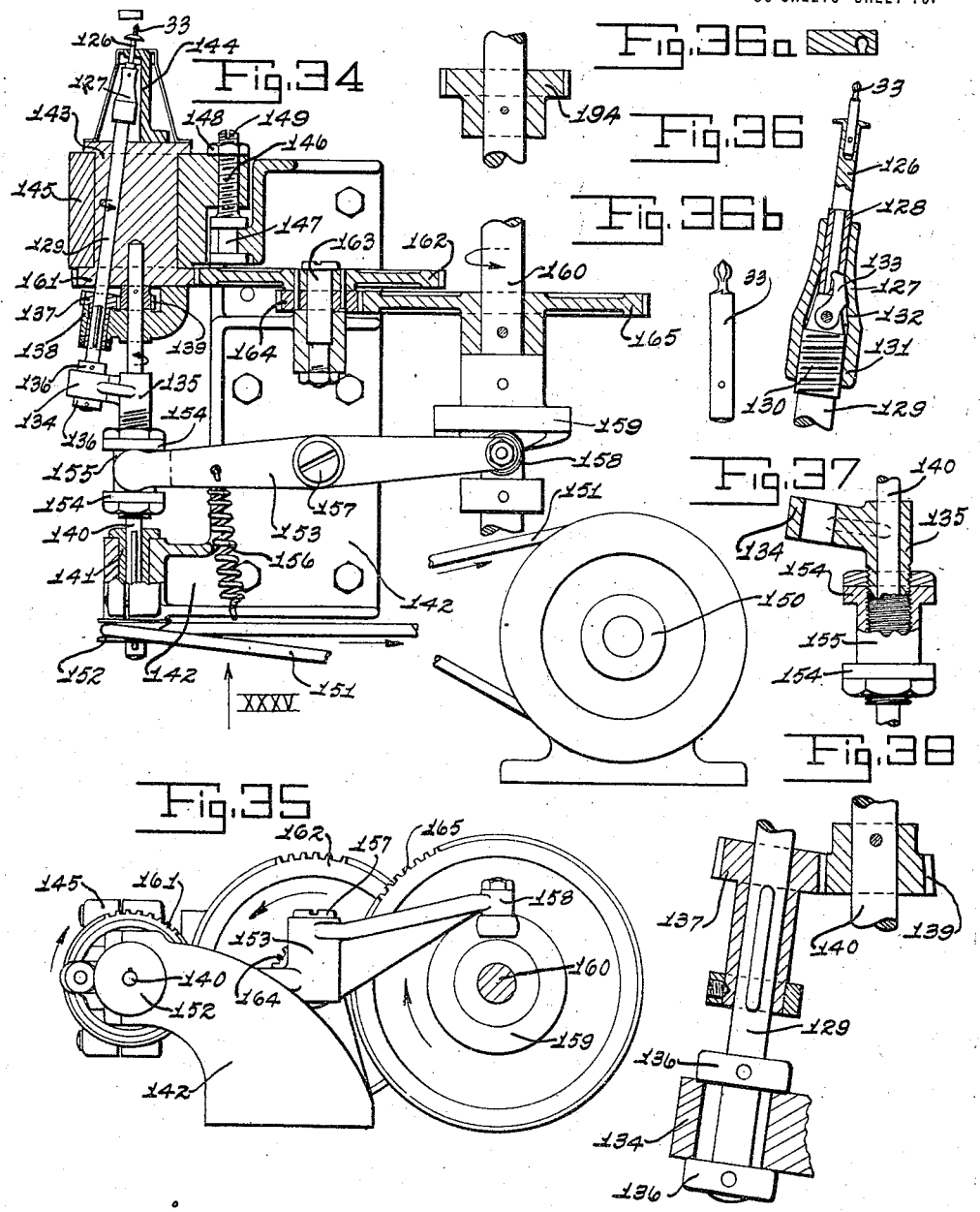

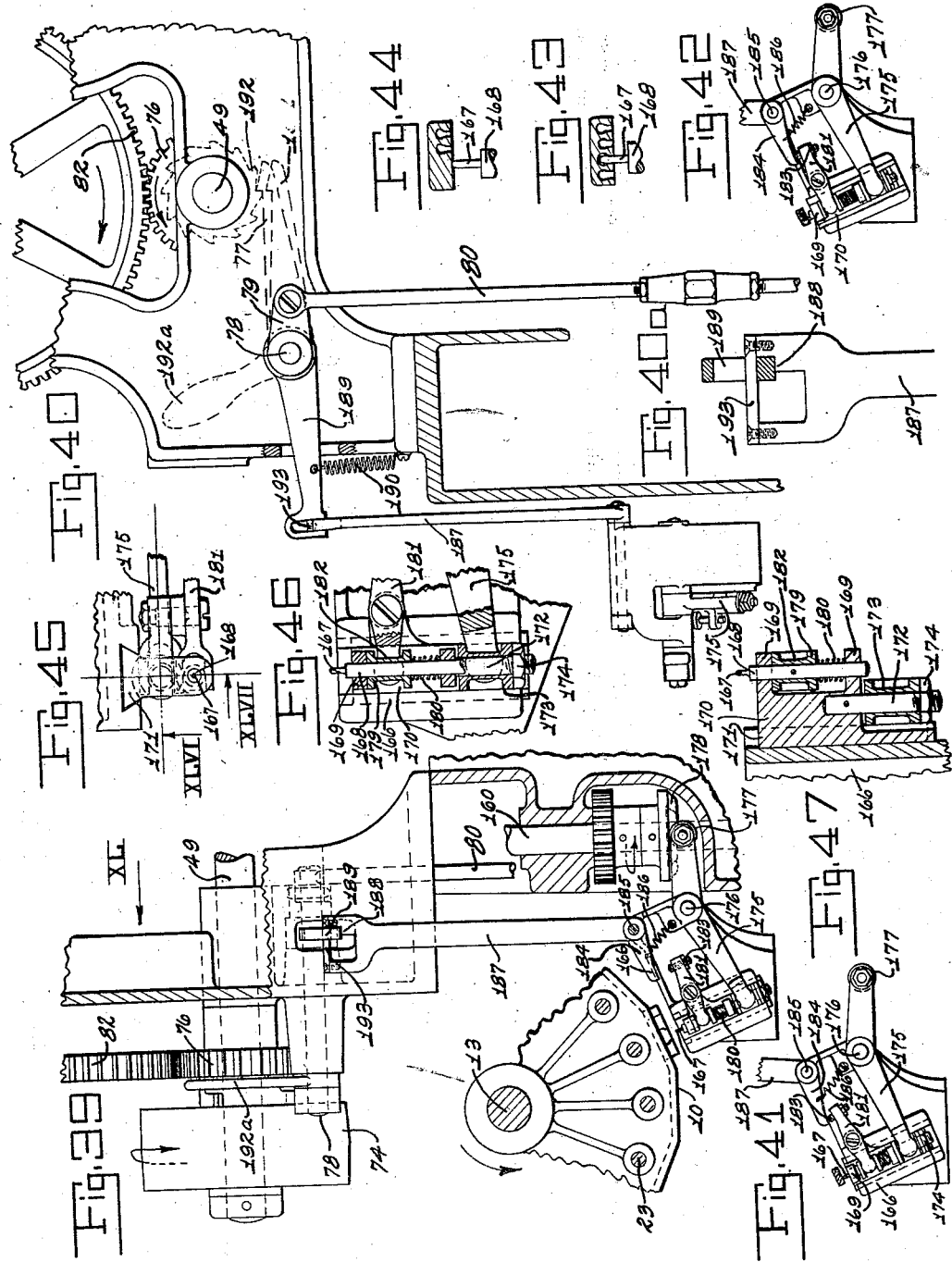

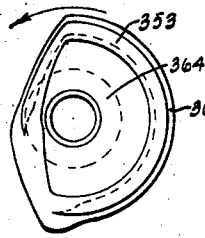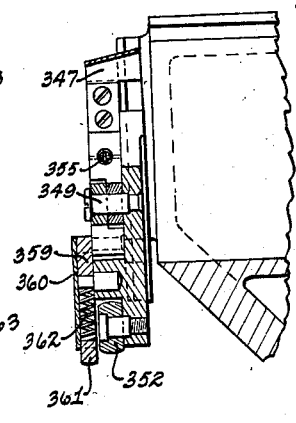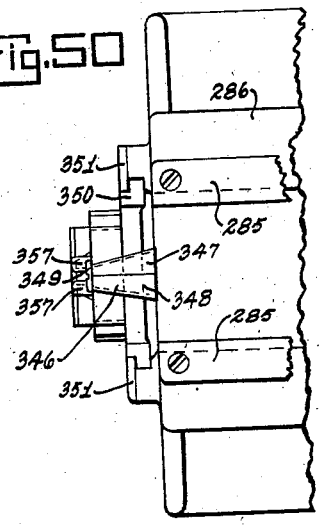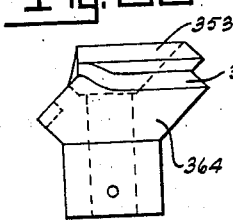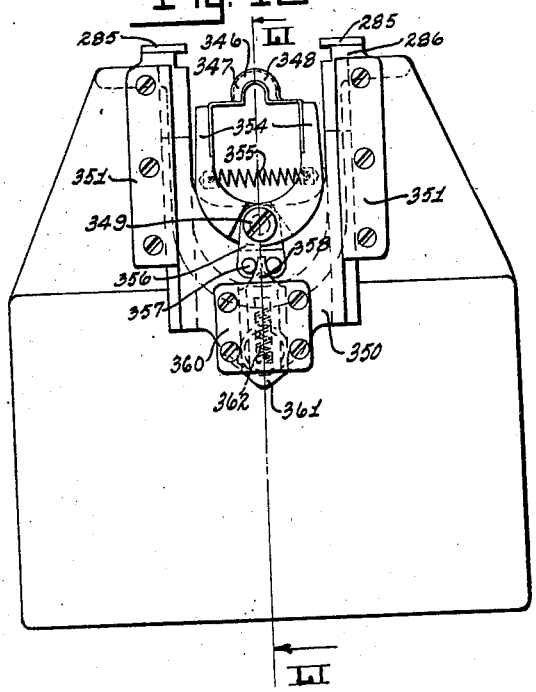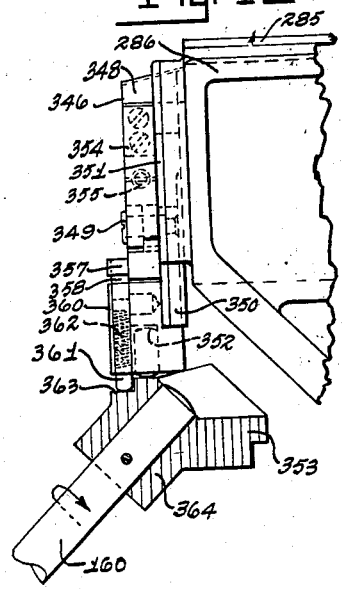

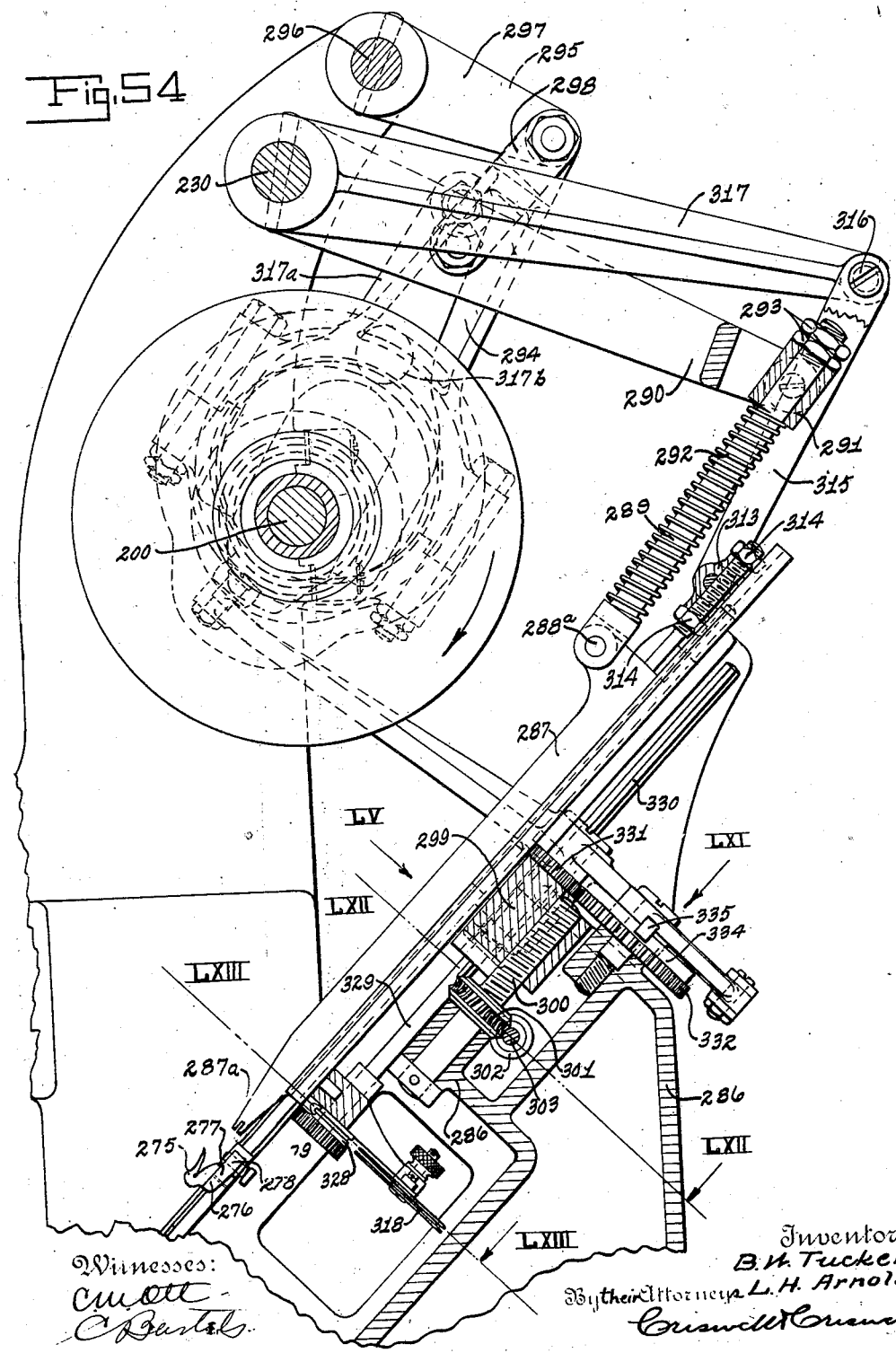

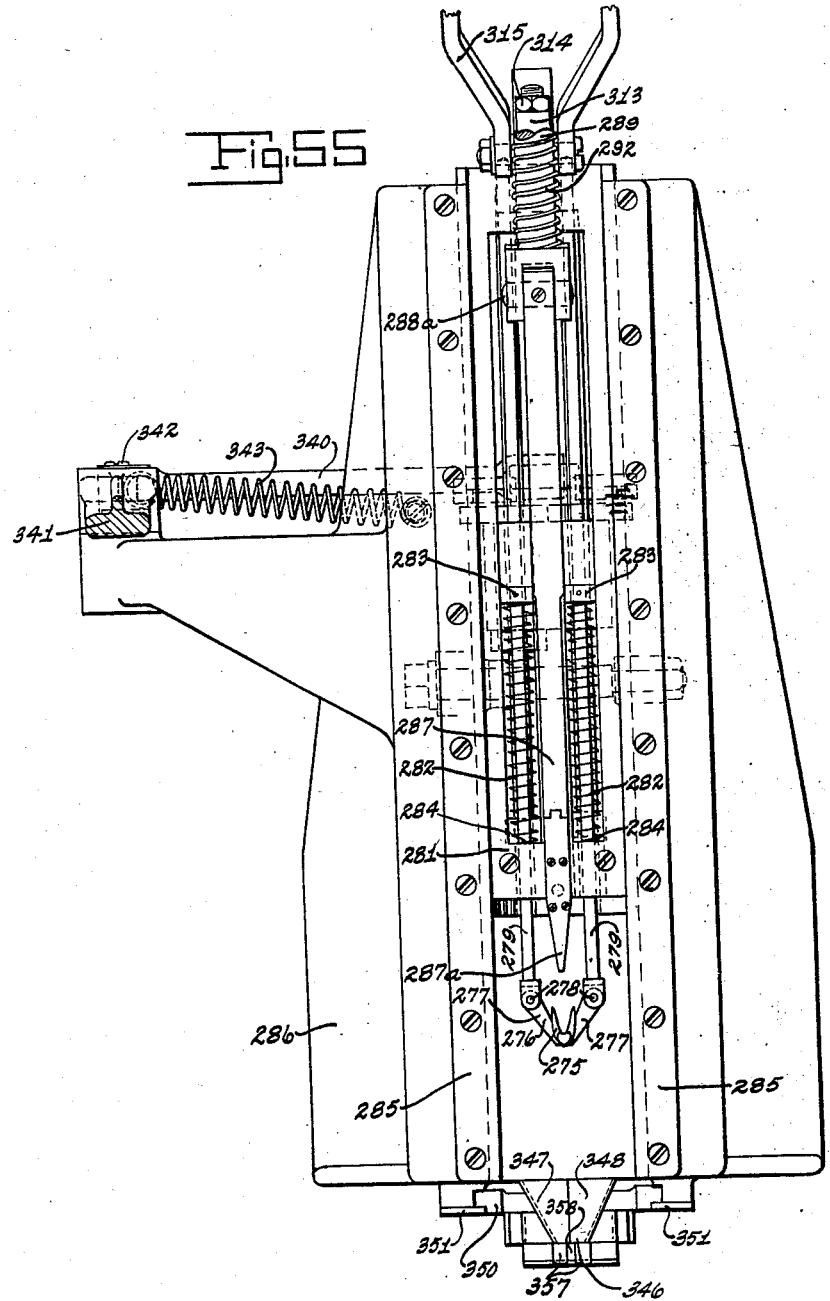

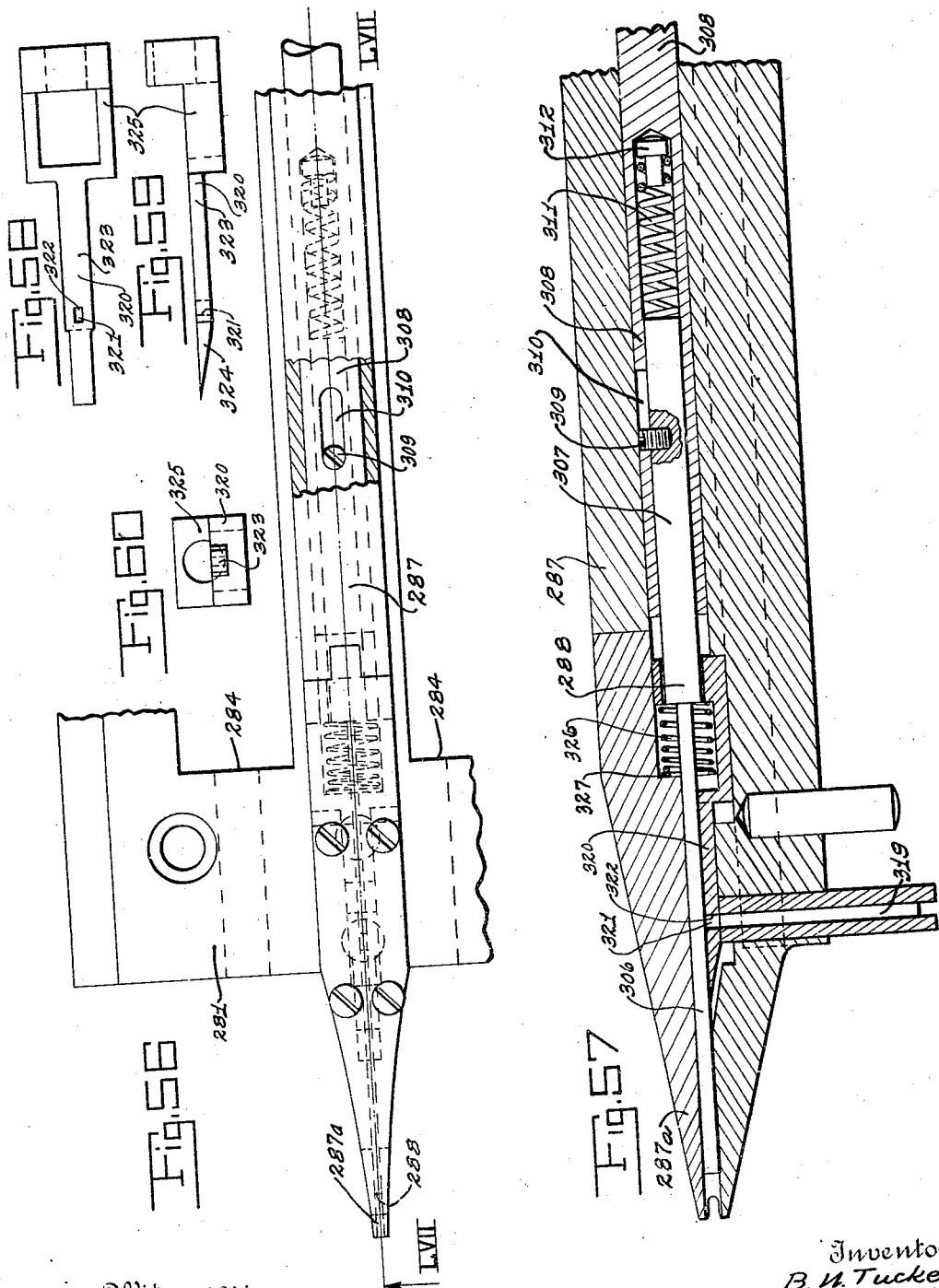

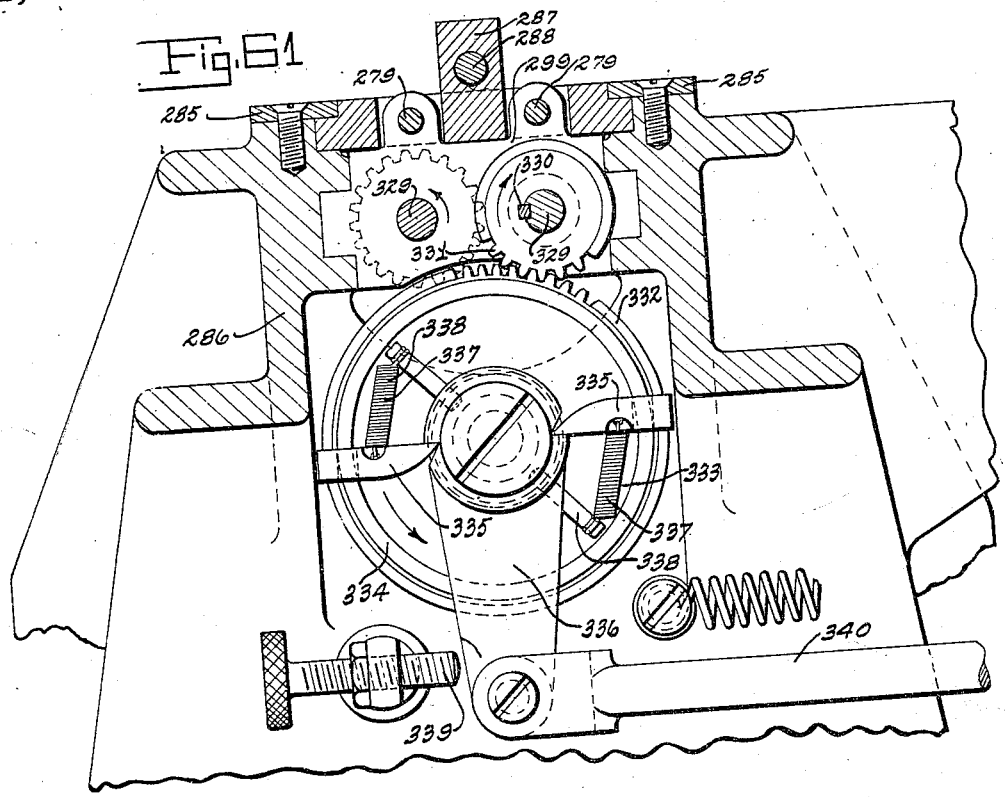
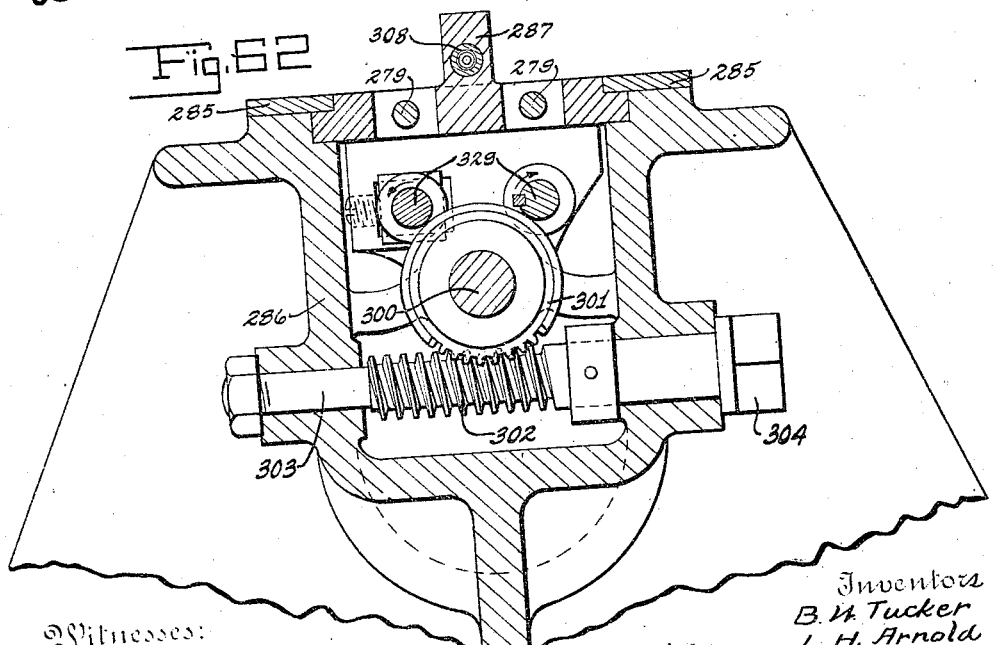

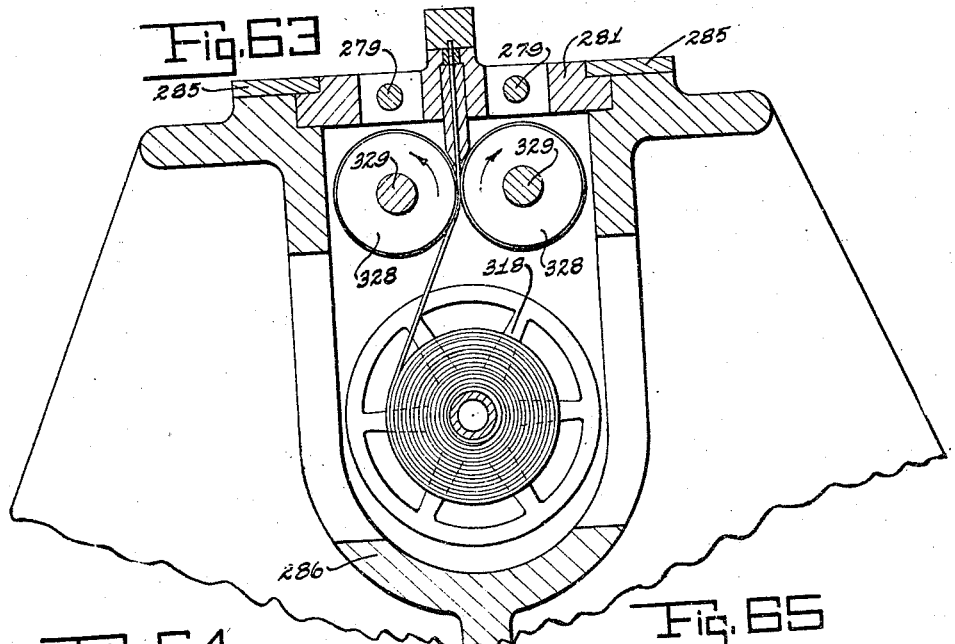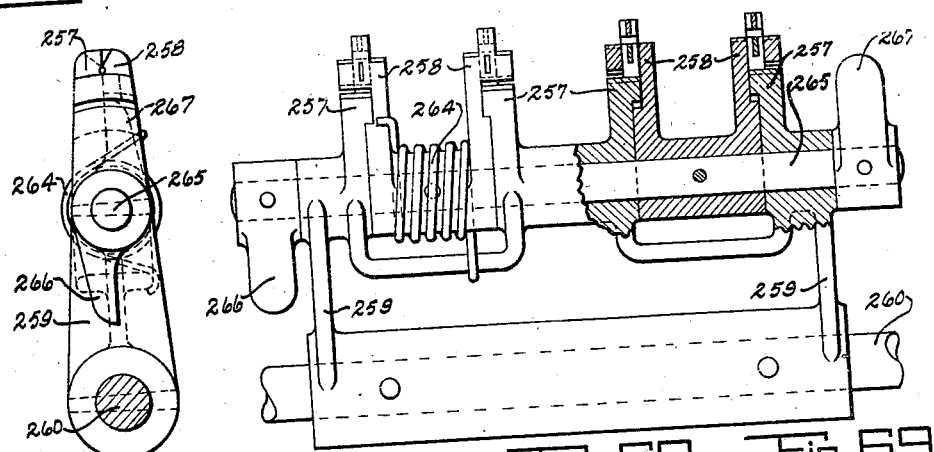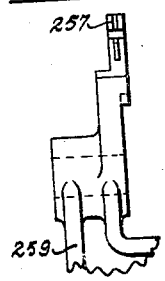

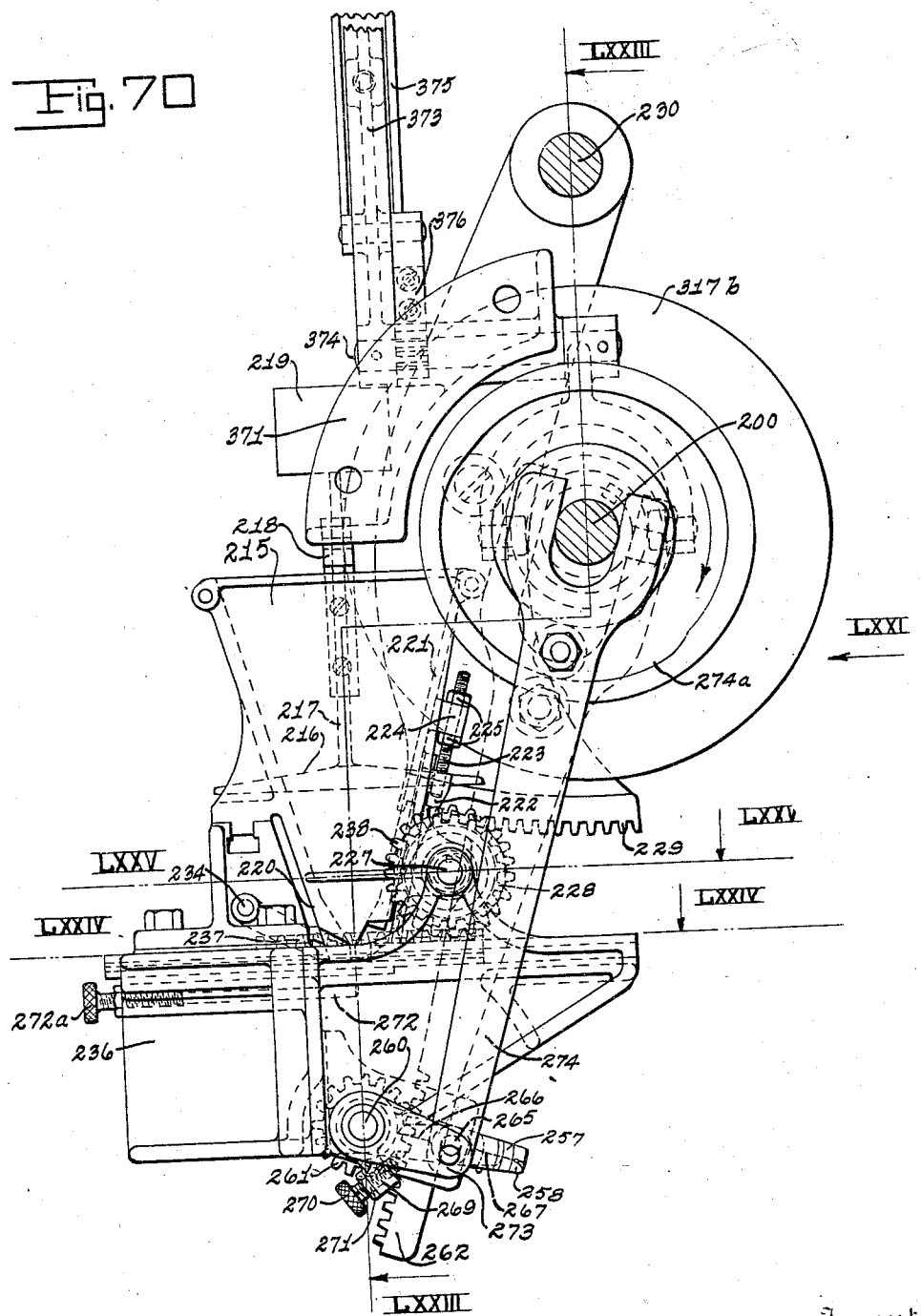

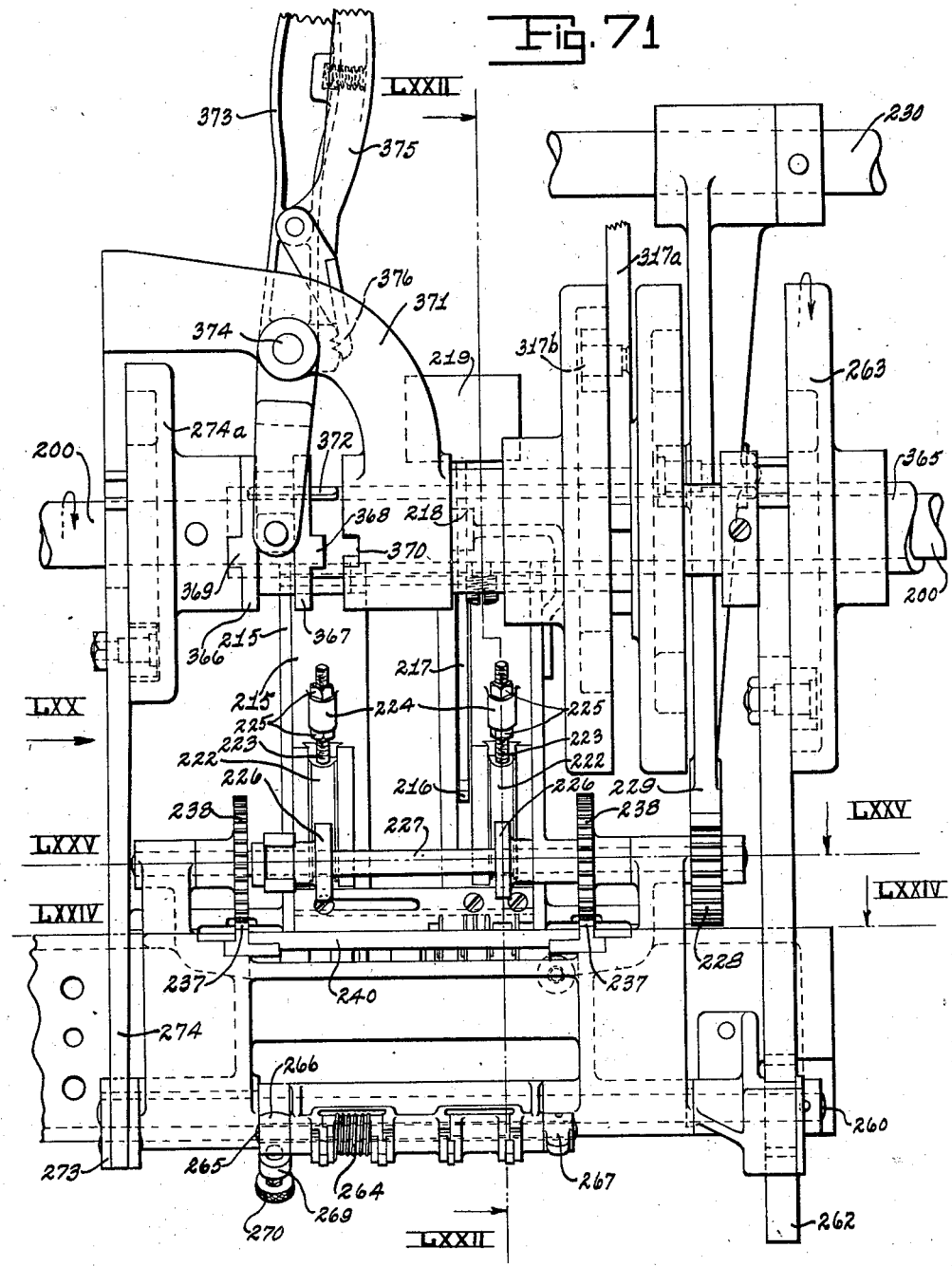

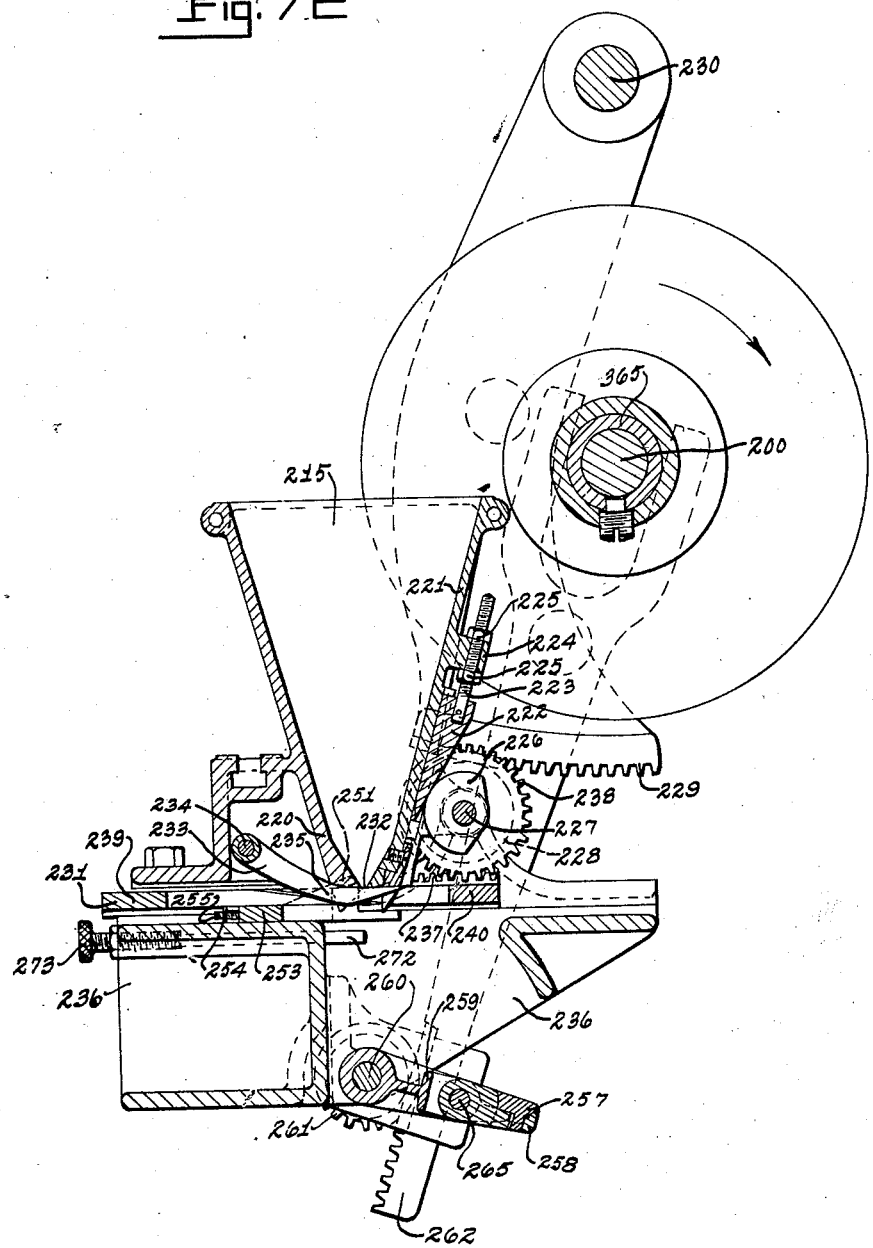

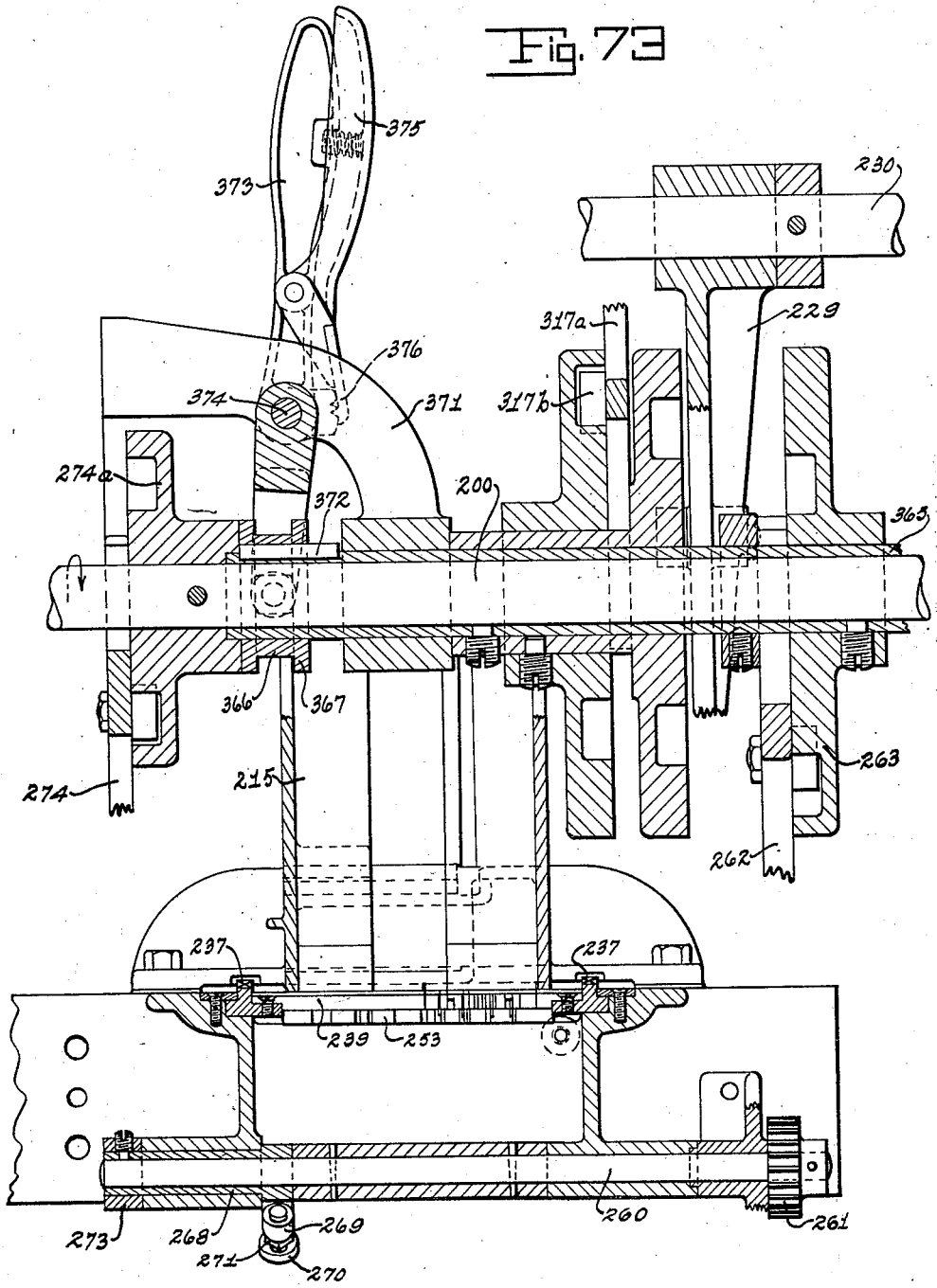

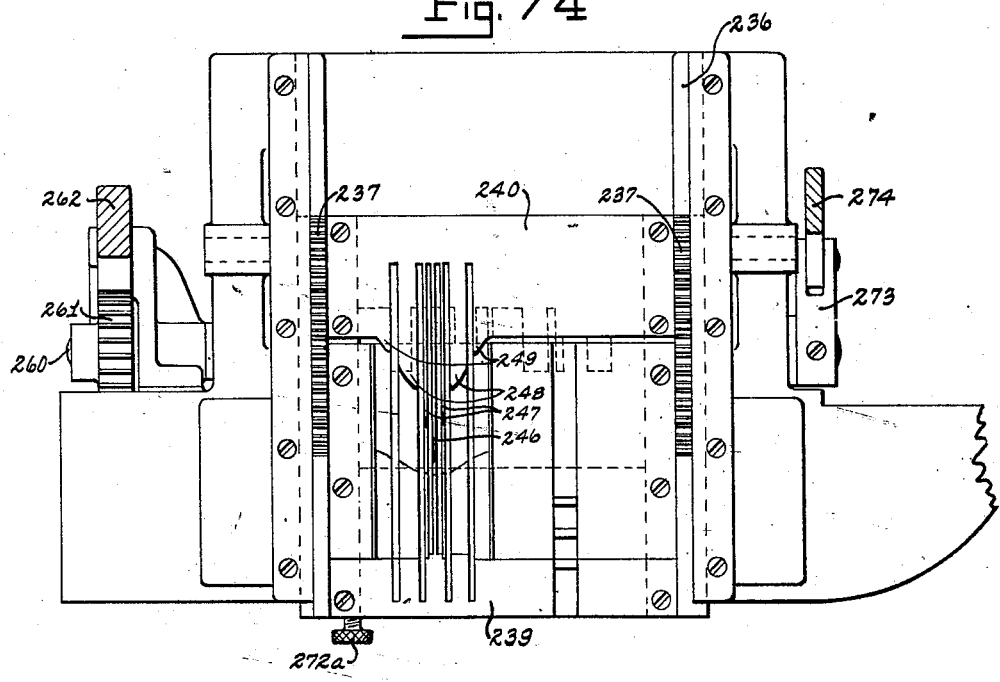
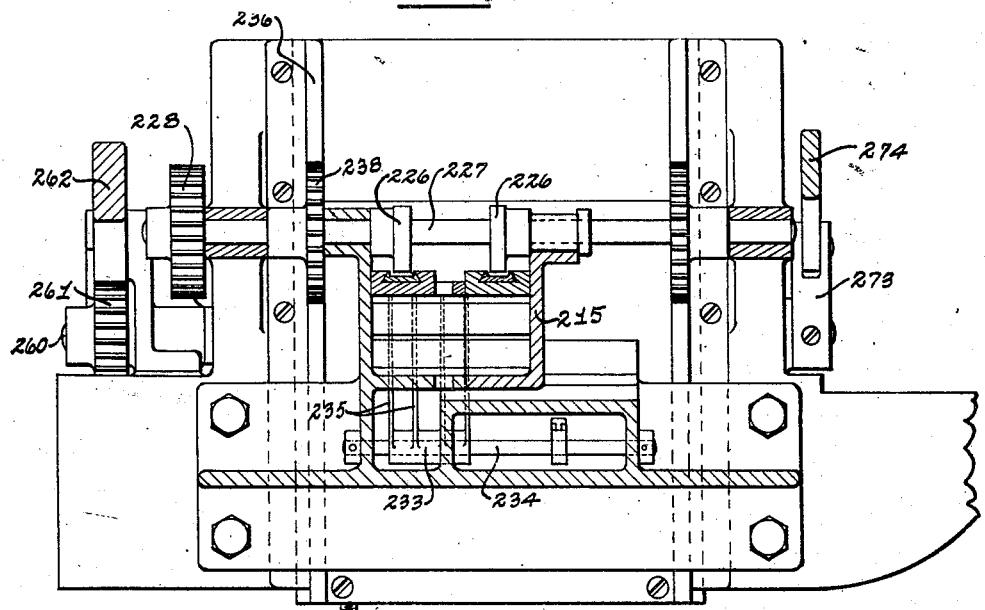

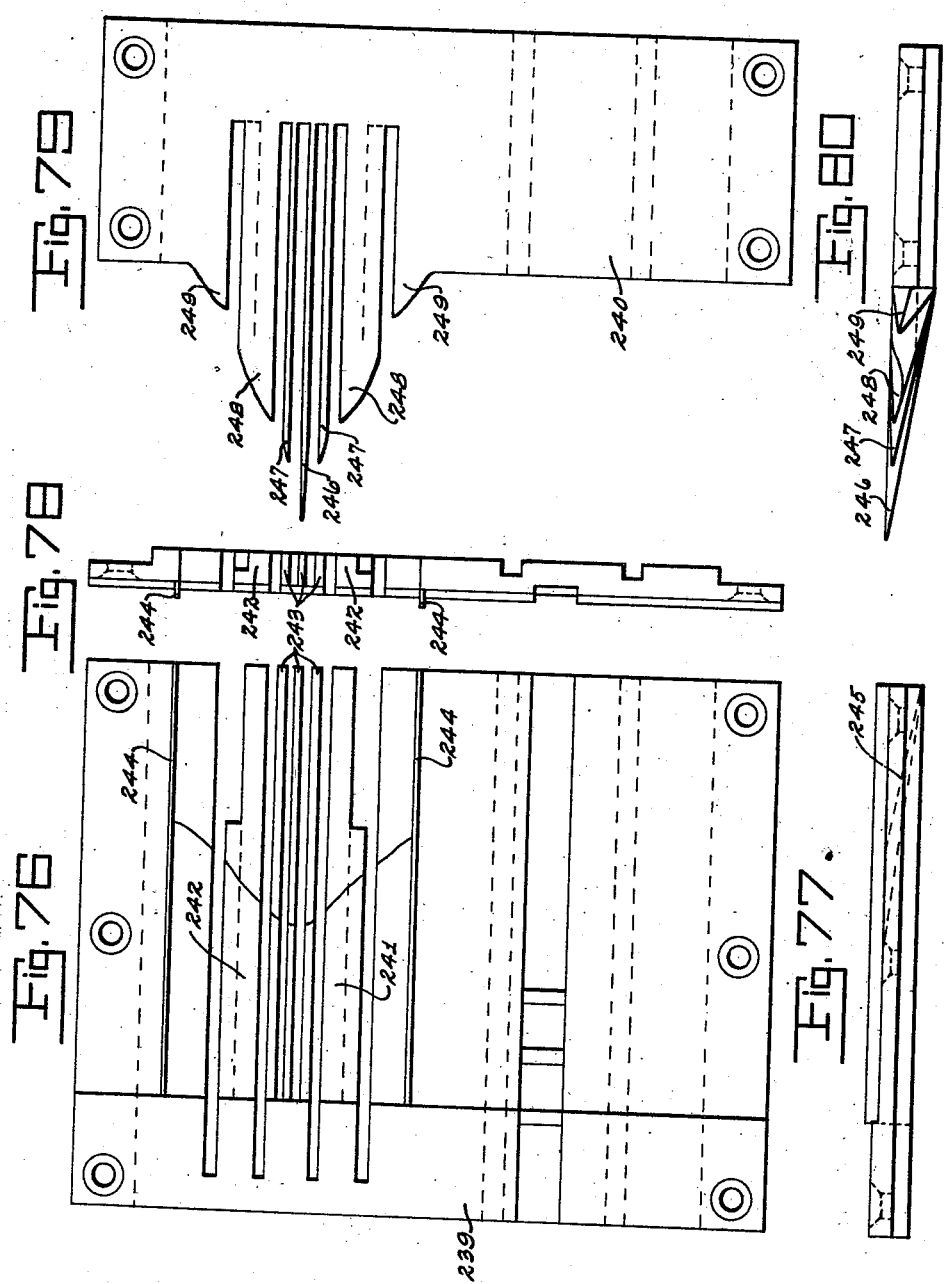

B. W. TUCKER & L. H. ARNOLD.
BRUSH MAKING MACHINE.
APPLICATION FILED MAY 21, 1915.
1,240,516.
Patented Sept. 18, 1917.
30 SHEETS—SHEET 30.
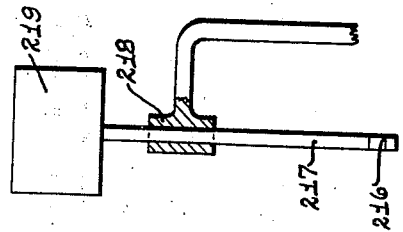
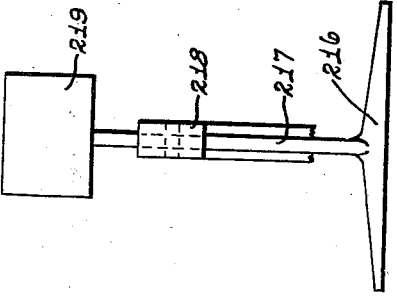
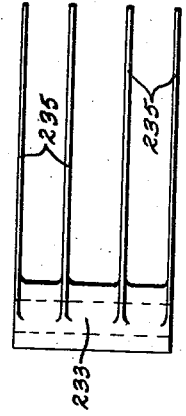
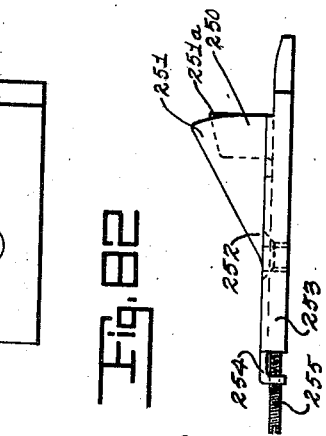
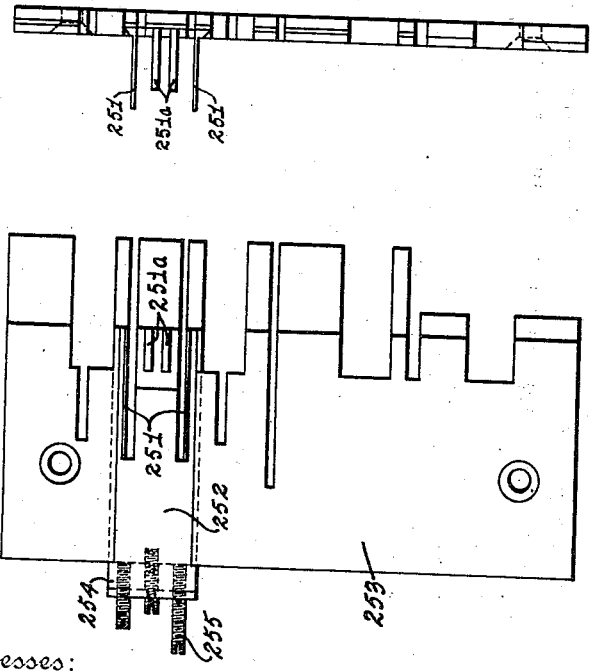
Witnesses:
Inventors
B. W. Tucker
By their Attorneys L. H. Arnold

UNITED STATES PATENT OFFICE.

BENJAMIN W. TUCKER, OF SOUTH ORANGE, NEW JERSEY, AND LUCIEN H. ARNOLD, OF CHICAGO, ILLINOIS, ASSIGNORS TO MALGAM BRUSH COMPANY, INC., A CORPORATION OF NEW JERSEY.

BRUSH-MAKING MACHINE.

1,240,516.  Specification of Letters Patent.  Patented Sept. 18, 1917.

Application filed May 21, 1915. Serial No. 29,698.

*To all whom it may concern:*

Be it known that we, BENJAMIN W. TUCKER and LUCIEN H. ARNOLD, citizens of the United States, and residents of South Orange, county of Essex, and State of New Jersey, and Chicago, county of Cook, and State of Illinois, respectively, have jointly invented certain new and useful Improvements in Brush-Making Machines, of which the following is a full, clear, and exact description.

This invention relates more particularly to the machinery for making tooth brushes in which the tufts of bristles are anchored in the brush back or blank.

One of the principal objects of the invention is to provide an automatic machine which will hold one or more blanks or brush backs and which will drill the holes for the bristles and enlarge such holes inwardly to make the holes larger at the bottom than at the face of the blank, and which machine will separate, form and feed tufts of bristles into the holes of the brush back and anchor each tuft within the enlarged opening by a metal or other anchoring element to spread the tuft and lock the same against removal, thus reducing to a minimum the liability of the bristles becoming loose or detached from the back while in use, which often results in injury to the person using this class of article.

Other objects of the invention are to provide a simple and efficient turret which is adapted to hold a number of brush backs or blanks and bring the same in correct registration during the period required for the drilling of the backs and reception of the tufts of bristles and to release the backs automatically after they have been filled with the proper number of tufts of bristles; to provide simple and efficient means for drilling the openings for the bristles and enlarging said openings from the face inwardly; to provide simple means for imparting a step-by-step movement to the brush back holding turret to place the same convenient for the drilling means to drill the successive rows of holes; to provide simple means for automatically rotating the turret to place the blanks or backs of the brushes successively in position to be drilled; to provide means for detecting a blank or false hole in such a way that the machine will be automatically stopped in case the drill has become broken or missed drilling one of the holes properly for the reception of the tufts of bristles; and to provide simple means whereby the brush backs may have the holes of one row staggered with relation to the next row adjacent thereto and the number of holes in the rows made to correspond or vary as desired.

Another object of the invention is to provide simple and efficient means for holding the bristles and for separating the same and causing such separated bristles to be transferred to a plunger mechanism and by the plunger mechanism forced into the holes or openings provided in the brush blank.

A further object of the invention is to provide simple and efficient means for feeding a metal anchoring element in the form of a strip and by the same means which forces the bristles into the openings in the brush back to cut the anchoring element from the strip and force the cut-off portion home over the tuft of bristles and thereby effectively hold and anchor the tuft in the opening in the brush back.

A still further object of the invention is to provide simple and efficient means whereby a tuft of bristles of one row may be automatically spread or forced away out of the path of a tuft of bristles of an adjacent row in order that the bristles already fed and held to the brush back will not interfere with another tuft as it is being fed and inserted in one of the holes.

With these and other objects in view, the invention will be hereinafter more particularly described with reference to the accompanying drawings, which form a part of this specification, and will then be pointed out in the claims at the end of the description.

In the drawings, Figure 1 is a front elevation of one form of machine embodying our invention, looking in the direction of arrow I of Figs. 2, 4 and 6.

Fig. 2 is an end elevation, looking at the right hand side of the machine in the direction of arrow II of Figs. 1 and 5.

Fig. 3 is a rear elevation, looking in the direction of arrow III of Figs. 2, 4 and 5.

Fig. 4 is an end elevation, looking in the direction of arrows IV of Figs. 1, 3 and 5.

Fig. 5 is a plan view, looking in the direction of arrows V of Figs. 1, 2, 3 and 4.

Fig. 6 is a vertical section, partly in elevation, taken on the line VI—VI of Figs. 1 and 3, showing the relative position of the turret, drilling mechanism, detector mechanism, hopper for the bristles, and means for handling the separated bristles and the metal anchoring material.

Fig. 7 is a sectional view of the main driving clutch and pulley with the trip for starting and stopping the machine, the section being taken on the line VII—VII of Fig. 8.

Fig. 8 is a section through the pulley shaft shown in Fig. 7 with some of the parts broken away to illustrate in a better way some of the parts of the invention.

Fig. 9 is a vertical section, taken on the line IX—IX of Fig. 7, showing a part of the clutch removed and in section.

Fig. 10 is a sectional view taken on the line X—X of Fig. 8.

Fig. 11 is a vertical section, taken on the line XI—XI of Figs. 1 and 3.

Fig. 12 is a fragmentary vertical section, taken on the line XII—XII of Fig. 11, showing a part of the mechanism for moving the brush holding turret lengthwise with a step-by-step movement in position to have the holes successively drilled.

Fig. 13 is a vertical section, taken on the line XIII—XIII of Fig. 14, showing part of the mechanism for giving a step-by-step movement to the brush holding turret.

Fig. 14 is an elevation, partly in section, of the mechanism shown in Fig. 13, showing in section the heart-shaped cam which serves to give the longitudinal movement to the brush holding turret.

Fig. 15 is a vertical section, taken on the line XV—XV of Fig. 14.

Fig. 16 is a detail perspective view of the pawls and springs therefor which move the ratchet wheels of the mechanisms shown in Figs. 13 and 14.

Fig. 17 is a detail view of the heart-shaped cam that actuates the slide or head in which is mounted the turret for the brushes and brush backs or blanks.

Fig. 18 is a diagram indicating the position of the trundle in the heart-shaped cam at the beginning of the rows of holes in the brush handle or back and at each intermediate position.

Fig. 19 is a fragmentary detail view of one of the brush handles or backs showing the relative arrangement of the holes and the number thereof ready to receive the tufts of bristles.

Fig. 19$^a$ is a fragmentary side elevation, partly in section, showing several of the holes filled with bristles.

Figs. 19$^b$ to 19$^d$ are fragmentary sectional views showing different steps from the insertion of a tuft of bristles to the anchoring of the tuft.

Fig. 19$^e$ is an enlarged view showing a tuft of bristles with the anchoring element ready to be upset and a tuft in which the element has been upset to anchor the tuft.

Figs. 20, 21, 22 and 23 are detail views of the adjustable blocks or members for regulating the spacing of the holes in the brush handles or backs.

Fig. 24 is a detail perspective view of the actuating rod for the pawl-carrying arm shown in Figs. 13 to 15.

Fig. 25 is a plan view, partly broken away and partly in section, of the brush holding turret and means rotating said turret.

Fig. 26 is a front view of the turret and slide removed from the remainder of the machine.

Fig. 27 is an end view, partly broken away and partly in section, of the turret and slide and the means for rotating said turret.

Fig. 27$^a$ is a detail side elevation of the detachable section of a part of the turret which permits a defectively drilled brush blank to be removed.

Figs. 28 and 29 are detail perspective views of the trip disks for the clutch of the rotating means for the brush holding turret.

Fig. 30 is a sectional elevation of the turret clutch showing the tripping pawls or dogs.

Fig. 31 is an elevation, partly in section, of the clutch for the turret.

Fig. 32 is a vertical section, taken on the line XXXII—XXXII of Figs. 33 and 33$^a$, showing a part of the mechanism for controlling the turret rotating means.

Figs. 33 and 33$^a$ are separated views taken on the line XXXIII—XXXIII$^a$ of Fig. 32.

Fig. 34 is a fragmentary vertical sectional elevation of the drilling mechanism.

Fig. 35 is an inverted plan view of part of the mechanism shown in Fig. 34.

Fig. 36 is a fragmentary sectional view of the drill holding chuck.

Fig. 36$^a$ is a transverse section of a brush handle or blank showing the shape of one of the holes for the bristles.

Fig. 36$^b$ is a detail view of one of the drills.

Fig. 37 is a detail sectional view of part of the means for moving the drill spindle vertically while drilling.

Fig. 38 shows in section parts of the rotating means for the drill spindle which also permits lengthwise movement of said spindle.

Fig. 39 is a fragmentary view, partly in section, of the detector mechanism and method of operating the same to stop the machine in case the hole for the reception of the tuft of bristles is not properly made or not made at all by reason of the breaking of the drill and before the brush blank or back with the holes is placed in position to receive the bristles.

Fig. 40 is a fragmentary view of a part of the mechanism shown in Fig. 39, looking from the rear, some of the parts being broken away and other parts of the machine being shown in section.

Fig. 40ª is a fragmentary view, partly in section, showing a part of the machine stopping mechanism for the detector.

Fig. 41 is a fragmentary view of the detector in the act of tripping the clutch and stopping the machine.

Fig. 42 is a view similar to Fig. 41, except that it shows the detector as it fits in a properly drilled hole and therefore does not trip the clutch and stop the machine.

Fig. 43 is an enlarged transverse section of a brush blank or handle showing how the detector enters each opening after it is drilled.

Fig. 44 is a transverse section of one of the brush blanks or backs showing how the detector strikes the solid portion when the blank has not been drilled properly and in so doing will position the parts to stop the machine.

Fig. 45 is a fragmentary detail plan of a part of the detector operating mechanism.

Fig. 46 is a fragmentary vertical section, partly in elevation, taken on the line XLVI of Fig. 45.

Fig. 47 is a vertical section taken on the line XLVII of Fig. 45 of a part of the detector mechanism.

Fig. 48 is a detail elevation looking upward into the machine in the direction of arrow XLVIII of Fig. 6, showing the means for pushing the tufts of bristles already set in the back out of the path of the punch and the bristles about to be forced into one of the holes in the back.

Fig. 49 is a side elevation of the mechanism shown in Fig. 48, showing in section the cam for operating the spreaders.

Fig. 50 is a plan view of the mechanism shown in Figs. 48 and 49.

Fig. 51 is a vertical section, taken on the line LI—LI of Fig. 48.

Figs. 52 and 53 are views of the cam for operating the mechanism shown in Figs. 48 to 51.

Fig. 54 is a fragmentary vertical section, showing the plunger and operating mechanism therefor together with the means for feeding the metal anchoring material and also the bristles to the brush backs or handles and what may be called the plunger mechanism.

Fig. 55 is a fragmentary plan view of the plunger and mechanism shown in Fig. 54.

Fig. 56 is an enlarged detail view, partly broken away, of the plunger means for forcing the bristles and metal anchors into the holes of the brush back or handle.

Fig. 57 is a fragmentary vertical section taken on the line LVII—LVII of Fig. 56, showing how the metal anchoring pieces may be cut off from the strip, also showing the plunger for driving the tuft of bristles and the anchoring pieces into the holes of the brush.

Fig. 58 is a detail plan view of the metal cutter.

Fig. 59 is a side elevation, and Fig. 60 an end elevation of the cutter shown in Fig. 58.

Fig. 61 is a fragmentary section elevation showing one means for feeding the anchoring metal.

Fig. 62 is a transverse section of the adjusting mechanism for determining one position of the plunger, the section being taken on the line LXII—LXII of Fig. 54.

Fig. 63 is a transverse section taken on the line LXIII—LXIII of Fig. 54, showing the means for holding the metal and for feeding the same in position to be cut and for the plunger to force the cut piece into one of the openings or holes of the brush back after the tuft of bristles has been inserted therein.

Figs. 64 to 69 are views of the bristle transfer mechanism for transferring the tufts of bristles from the separating means into position to be acted upon by the plunger mechanism.

Fig. 70 is a side elevation of the hopper and part of the mechanism for separating the bristles and for transferring the same.

Fig. 71 is a rear elevation, partly broken away, of the bristle feed mechanism, looking in the direction of arrow LXXI of Fig. 70.

Fig. 72 is a vertical section, taken on the line LXXII—LXXII of Fig. 71.

Fig. 73 is a vertical section, taken on the line LXXIII—LXXIII of Fig. 70.

Fig. 74 is a fragmentary sectional plan, taken on the line LXXIV—LXXIV of Figs. 70 and 71.

Fig. 75 is a sectional plan, taken on the line LXXV—LXXV of Figs. 70 and 71.

Figs. 76 to 80 are detail views of part of the means for separating the tufts of bristles ready to be transferred to the plunger mechanism.

Figs. 81 to 85 are views of other parts of the bristle separating means; and

Figs. 86 and 87 are details of one form of means which may be employed to exert a downward pressure on the top of the bristles in the hopper.

In the general operation of the special construction of machine shown herein and which discloses one embodiment only of the invention, there are two main mechanisms, one relating to the handling of the brush handle, back or blank and preparing it for the reception of the bristles, and the other the handling and manipulating of the bristles so that they may be fed to and held properly in the brush backs or blanks. In a general way the particular machine shown has a turret provided with fixed and movable jaws between which the brush backs, handles or blanks are manually inserted. The jaws are automatically controlled so that during the rotary movement of the turret, the movable jaws will act automatically to hold the brush backs or blanks and when the brushes have been completely filled with bristles, the completed brushes will be automatically released. The brush holding turret is adapted to have a rotary and a lengthwise movement. The rotary movement varies in that it moves the turret short distances according to the spacing between the rows of holes for the bristles and the number of said rows, and then a greater distance to place a new brush blank in position to be drilled and remove the one already drilled away out of the path of the drilling mechanism. The turret has a step-by-step movement according to the number of holes in the rows and this step-by-step movement is timed with the rotary movement of the turret so that the blanks may be moved to the drill so that the drill will automatically form one row of holes and then the turret rotated to place the blank in position for the next row of holes and so on until each brush has its proper complement of openings or holes for the tufts of bristles. In this particular instance, although this may vary, each blank has four rows of holes, the two outer rows being of the same number and the two inner rows of greater number and the two inner rows are in staggered relation to the two outer rows. A single drill is provided and this drill by special mechanism not only drills a hole, but drills the holes much larger at the bottom than at the outer surface of the blank so as to form a substantially dovetailed or spreading connection between the brush handle or back and the tufts of bristles when inserted in said holes. The holes are drilled automatically and in succession and after the blank has been completed so far as the holes are concerned, the rotary movement of the turret will carry the blank into position to be operated on by the detector mechanism. This detector mechanism includes a pin and is so connected that in case the drill should be broken or a hole imperfectly formed and not of the proper depth, the said detector mechanism will automatically stop the machine. In case one of the blanks should be defective, the turret is so arranged that this blank may be removed and another blank placed in its stead or the machine may be made not to feed bristles to the turret during the time that the removed blank would be in position to receive bristles. The bristles are held in a hopper and these bristles by reciprocatory and other means are separated into the proper amount to make the tufts, said bristles being usually double the length of the completed tufts or longer if desired and in any case of sufficient length to permit proper trimming after the brushes have been filled. The separated bristles by a transfer mechanism are carried to a plunger mechanism and by this plunger mechanism are forced into the holes or openings in the brush blanks. During the movement of the plunger mechanism to force the tufts of bristles, which latter have been doubled upon themselves to form the same into the proper shaped tufts, the metal anchoring material has been fed into position and has been cut off. After the tuft of bristles has been forced into one of the openings, the plunger moves outward far enough to take the separated or cut off portion of the anchoring material and drives the same forward into the opening or hole over the bent or formed tufts and in such a way as to effectively anchor the tuft in the hole, there being means provided for spreading the tufts previously placed in position and holding them in such a way that they will not interfere with the insertion and anchoring of the tufts of bristles. This operation continues through the successive brushes and after the completed brushes are released automatically from the turret, new blanks are placed in position and the machine continues to operate as long as desired.

The special machine shown is designed to make tooth brushes in which there are four rows of tufts, the two outer rows having eighteen holes each and the two inner rows having nineteen holes with the latter rows arranged in staggered relation to the outer rows, though it will be understood that the character of the article and the number of rows and number of holes and their relation with respect to each other may be changed.

The brush blanks or handles are made of the shape and size corresponding to the finished article except for the drilling of the holes and the insertion of the tufts of bristles. These blanks may be held in any desired way. As shown, a turret 10 is arranged to have a rotary and longitudinal movement upon the frame 11 and is so constructed as to hold a number of brush blanks or backs so that different blanks may be acted upon simultaneously by different mechanisms, thus increasing the capacity of the machine without increasing its speed. The turret 10 has a head 12, Figs. 1, 2, 25, 26 and 27, which is secured to a shaft 13. The head 12 is provided with a plurality of peripheral faces 14 making the said head polygonal in form and held to each face is a fixed jaw 15. This jaw 15 is provided with a stop or gage 16 forming a stop for the end of the brush blank to position the same on said head. A movable jaw 17 is slidingly held upon each face 14 of the turret head and said jaw 17 is adapted to coöperate with the jaw 15 to rigidly hold the brush blank with the face to be drilled outward, said jaws 15 and 17 being provided with projecting ledges to serve as a better clamping means for the blank. Each jaw 17 has a transversely extending engaging part 18 and a dovetailed part 19 which is adapted to move between the guides 20. On the sliding part 19 are rack teeth 21 which are adapted to be engaged by the teeth of a segment 22. This segment is held to a rod or shaft 23 and is normally forced to move the jaw 17 to a released position by means of a spring 24, the inner end of said spring resting against a lug or ribbed portion 25 one for each spring. Each rod 23 has an arm 26 loosely held on the outer end thereof, one end of which arm is provided with a roller 27, the latter being adapted to engage the periphery of a normally fixed disk or cam 28. A second arm 29 is held fast to each rod 23 and this arm extends inward and over its adjacent arm 26 carrying the roll 27. Each arm 29 is provided with an adjustable screw 30 which may be locked in position by a nut 31 and said screw is adapted to engage a part of the arm 26 so that when the arm 26 is moved, a like movement is given to its coöperating arm 29. The disk or cam 28 during the rotary movement of the turret about the same, normally forces each movable jaw 17 toward its coöperating fixed jaw 15, the screw 30 permitting the relative adjustment between the arms so that the movable jaw may be properly positioned with respect to its coöperating fixed jaw on each of the faces 14 of the turret head. The disk or cam 28 is cut away, at 32, at the upper portion thereof to adapt the arms on each shaft 23 to move inward toward the shaft 13. This will cause the toothed segments 22 to move the jaws 17 away from the jaws 15, the rolls 27 of the jaw moving arms entering the cut-away portion 32 at this time so that two or more of the jaws in this position of the turret are open to adapt brush blanks to be readily inserted or to permit the completed brushes previously held by the released jaws to be removed.

To impart a longitudinal step-by-step movement to the turret so as to present the brush blank or back in different positions with respect to a vertically movable drill 33, various means may be employed. As shown, the turret shaft 13 is mounted to move with a slide, frame or head 34, Figs. 4, 11, 25 and 26, said slide being guided upon the ways or guides 35 of the machine frame. A trundle or roll 36 is carried by the slide 34 and enters a cam groove 37 of a substantially heart-shaped cam 38 which is secured to a shaft 39. A ratchet wheel 40 is held to rotate with the shaft 39 and is adapted to impart rotary movement to the heart-shaped cam 38 and through the latter give the desired step-by-step movement and the desired number of throws to the turret for the holes or openings in the different rows in the brush blank. The number of rows and the number of holes in each row of a brush may vary. For a brush having two outer rows of eighteen holes each and two inner rows of nineteen holes each, the ratchet wheel 40 in this case has forty-eight teeth representing two and one-half teeth for each hole. The teeth of the ratchet wheel are normally held against backward movement by two pawls 41 which are normally held in engagement with the teeth by springs 42, and said ratchet wheel is given a forward movement by means of two pawls 43 which are carried by an arm 44 and are normally pressed into engagement with the teeth of the ratchet wheel by springs 45. The arm 44 is rotatable about the shaft 39 and is normally forced in one direction by a spring 46 and in the opposite direction by an arm 47. The arm 47 extends upward and is provided with a slot 48 to span a shaft 49. On the arm or rod 47 is a trundle 50 which is adapted to be operated by a cam 51 on the shaft 49 so that at each rotary movement of the cam 51 a rocking motion is imparted to the arm 44 and through the latter, the pawls 43 are made to drive the ratchet 40 and through the latter the heart-shaped cam 38 by means of which a step-by-step movement is imparted to the blank holding turret 10. Owing to the number of holes in the rows and the relation of the holes of the rows to each other, it is necessary to impart different throws to the heart-shaped cam 38 and the blank or brush holding turret. To secure this result, the extent of backward movement of the pawls 43 is regulated and consequently the number of teeth past which the pawls 43 may move and the throw of the ratchet wheel is thus controlled. On the rod 47 is a block 52 which is adapted to move with said rod as it is actuated by the cam 51 and said block is adapted to engage the periphery 53 of blocks or rotary segments 54. These segments form an adjustable cam surface and this cam has an intermittent movement in sequence with the cam shaft 39, as will be presently described, and said segments comprise essentially two parts 55 and 56 which are adjustable with relation to each other by slots and bolts 56ᵃ or otherwise. The parts 55 each have a round portion 57 and each part 56 a straight portion 58, the part 58 representing the point of drop for the engaging portion of the block 52, and the part 57 being for the purpose of regulating the extent of this drop. It will be evident that during the rotary movement of this segmental cam and so long as the engaging portion 52ᵃ of the block 52 during the backward movement of the rod 47 engages the periphery 53 of the segments, the said backward movement of the rod 47 will be of equal extent and consequently a uniform throw will be given to the ratchet wheel 40 and to the heart-shaped cam 38. When the segments or blocks 54 move to a point where the engaging portion 52ª of the block 52 can drop over or by the part 58, the backward movement of the pawl actuating rod 47 will be greater and consequently a greater throw will be given to said ratchet wheel at this time, the extent of this throw being governed by the curved part 57. The number and extent of these drops vary with the change in the number of holes in the rows and the relative position of the holes of the different rows. In making the particular construction of brush shown with the stated number of rows and holes, the mechanism described imparts seventeen throws of two and one-half teeth each to the ratchet wheel 40 imparting corresponding lengthwise movements to the brush and blank-carrying turret 10, the drill 33 being operated to drill a hole each time the turret stops. After the row has been completed, a partial rotary movement is given to the turret, as will be presently described, and the pawl-carrying arm 47 is operated by reason of the drop to the block 52 the extent of five and one-half teeth to stagger the next row with relation to the row of holes already made. A step-by-step movement to the ratchet wheel of two and one-half teeth each for eighteen throws is next given to permit the drill 33 to make the second set of holes. There is then a jump of two teeth to start the third row of holes, the turret being given a rotary movement to that extent and then there are eighteen step-by-step movements of two and one half teeth given to complete the third row of holes in the brush blank, this latter row representing nineteen holes and corresponding in number to the second row. Owing to the position of the segments or blocks 54, a greater backward movement is permitted to be given to the pawl-carrying arm 47 so that the pawls will jump five and one-half teeth after which a uniform step-by-step movement of two and one-half teeth is given to the ratchet wheel 40 to permit the drill 33 to drill the fourth row of holes and then a jump is given to the pawls 43 of four teeth which brings the position of the turret back to the starting point, the said turret being given a greater rotary movement, as will be presently described, to move one brush blank away from the drill 33 to place the next blank in position to have the holes drilled therein. The holes are drilled in the blank first along one row; then a rotary movement is given to the turret for the next row; then the turret moves backward in the opposite direction for that particular row, a rotary movement is then given to the turret again and the holes of that row are made, thus in a continuous sinuous line. The action of the blocks 54 in sequence with the movement of the ratchet wheel 40 and cam 38 is obtained through a gear 59, Figs. 11 and 12 which gear 59 is in mesh with a larger gear 60, the latter being mounted to rotate independent of the shaft 49, and said shaft serving to drive the cam 51 of the ratchet and pawl driving mechanism.

The operation of the parts for imparting a lengthwise step-by-step movement to the brush holding turret is illustrated in Figs. 17 and 18 wherein the latter is a diagrammatic view and wherein the positions of the trundle or roll 36 are shown. The cam 38 makes two complete revolutions and in starting the first row of holes to be drilled the roll or trundle is positioned at A, Fig. 18. The first row of eighteen holes is completed when the trundle is at B when a greater throw is given to the cam to the point C to start the turret on its backward movement to make a row of nineteen holes which will be completed at the point D. A greater throw is given the cam to the point E by the means explained to complete the first revolution of the cam and position the turret for the third row of nineteen holes. This row is completed at the point F during the movement of the turret in the opposite direction after which a greater throw is given the cam to the point G to start the fourth or final row of eighteen holes which will be completed at the point H, it being understood that between each row of holes the turret is rotated and at the final movement of the cam, the turret is positioned by the cam at the starting point A for a new brush.

To impart a rotary movement to the brush or blank holding turret 10 so as to move each brush blank for the different rows and then move the turret a sufficient distance to remove the blank already drilled away from the drill 33 and place another blank in position to be drilled and ready for the step-by-step movement as already explained, the head 12 of the turret 10 has secured thereto a worm wheel or gear 61. This worm gear is preferably made in two sections so that in case of wear one section may be moved relatively to another a slight distance to compensate for the wear. The teeth of the worm gear 61 are engaged by a worm 62, Fig. 27, and this worm is held on a shaft 63 which is mounted in the sleeve 64 carried by the head or slide 34 and is movable therewith. On the outer end of the shaft 63 is a locking member 65 and toothed member 66 forming a part of a modified form of Geneva movement. The teeth of the member 66 are adapted to be engaged by the teeth of a larger gear or member 67 of the Geneva movement, the latter being secured to a shaft 68. The teeth of the member 67 and of the member 66 are such that they will move the shaft 63 and turret 10 three equal spaces corresponding to the distance between the rows of holes and then a greater throw to remove one brush out of the path of the drill 33 and place another blank in its stead, the member 66 being locked in each of these positions by means of the locking member 69 engaging portions of the member 65 and holding the same against movement as is usual. The shaft 68 extends inward and at the inner end thereof is held a miter gear 70 and this miter gear is in mesh with a similar gear 71. The gear 71 is held to a lengthwise moving shaft 72, the rotary movement of which is controlled by clutch mechanism 73, the latter being controlled to operate in sequence with the step-by-step movement of the ratchet and pawl mechanism for imparting a lengthwise movement to the turret so that said turret will have the proper rotary movement imparted thereto at the proper time.

The main drive pulley 74 is mounted loosely upon the shaft 49 and connected by a clutch mechanism 75 to be presently described, to rotate a spur gear 76 also loosely mounted on the shaft 49. The clutch mechanism 75 has three teeth adapted to engage a dog 77 to stop the machine after each revolution, if desired, said dog being normally in the path of the clutch teeth. The dog 77 is held to a shaft 78 and secured to said shaft is an arm 79, the latter being connected by a rod 80, Figs. 10 and 40, to a pedal 81, or otherwise so that so long as the pedal 81 is held down, it will move the trip dog 77 away from the teeth of the clutch and the machine will continue to operate. The gear 76 meshes with a larger gear 82 and said gear 82 is held to a shaft 83. At the rear end of the shaft 83 is held a gear 84 which meshes with a gear 85, Fig. 11, of the same size so as to impart to the shaft 49 to which it is held the same rate of speed as the shaft 83 and by which mechanism the ratchet and pawl mechanism for the rotary cam 48 is operated and the step-by-step lengthwise movement of the brush holding turret is obtained.

The clutch mechanism 75 of the main drive is a modified type of a well-known form of clutch. As shown, the main drive pulley 74, Figs. 7 to 9, has a drum portion 86 provided with internal teeth 87 which are adapted to be engaged by a dog 88. The dog 88 is pivotally held, at 89, to a disk or block 90 loosely mounted on the shaft 49, and said dog has its engaging end or tooth normally forced to an engaging position by a spring 91. The block or disk 90 is provided with clutch or interlocking teeth 92 which are adapted to engage recesses or teeth on the inner end of the hub 93 of the gear 76 so that said gear and disk or member 90 will rotate in unison. A cover or disk-like member 94 forms a friction member and has a hub portion 95. This member 94 serves to inclose the block or disk member 90 and also the hub portion 93 of the gear 76 and is adapted to be held stationary or to rotate with said gear when the machine is in operation. The hub 95 of the member 94 is provided with one or more teeth, in this case three, any one of which is adapted to be engaged by the dog 77 and hold the member 94 stationary. On the inner face of the member 94 is a lug or projection 96 which is adapted to engage a tooth 97 on the block or disk 90. The member 94 also carries a boss 98 in which is adapted to move a pin 99, the latter being pressed outward by a spring 100. The outer end of the pin 99 is adapted to engage the tail 101 of the pawl or dog 88 but normally not with such force as will disengage the dog 101 because the spring 100 is not as strong as the spring 91. The normal position of the trip dog 77 is in engagement with one of the teeth on the hub of the member 94 so as to hold said member stationary. This stationary position of the disk or member will cause the pulley 74 in its rotary movement with the dog 88 to cause the tail end 101 to engage the spring-pressed pin 99, and owing to the latter being stationary during the engagement of the clutch trip dog 77 with one of the teeth of the member 94 sufficient force is obtained to disengage the pawl 88 and thereby permit the pulley to rotate independently and loosely on the shaft 49 free of the rest of the clutch. If, however, the treadle 81 is depressed, the dog 77 is forced from engagement with the teeth on the hub of the member 94, the spring 91 at this time forcing the pawl or dog 88 into engagement with the clutch teeth 87 so that the engagement thus made with the pulley 74 will cause them to rotate in unison and this will impart rotary movement to the gear 76 and through it operate the gears 82, 84 and 85 and rotate the shaft 49, and through the latter and the pawl and ratchet mechanism described, give a lengthwise step-by-step movement to the brush holding turret as already explained.

To time the rotary movement of the turret 10 and operate the same at the proper time with respect to the lengthwise movement thereof, the gear 60, Fig. 11, which meshes with the gear 59 has secured thereto a gear 102. The gear 102 is in mesh with a gear 103 which is loosely mounted on the shaft 83 and this gear 103 has a miter or bevel gear 104 held thereto. The miter gear 104 is in mesh with a miter or bevel gear 105 which is held to the inner end of a shaft 106. The shaft 106 is journaled in bearings 107 at the upper part of the machine and between said bearings are arranged cams 108 and 109, which are similar in construction but are arranged substantially at right angles to each other. Each of these cams is adapted to engage a part 110 on the outer end of a connecting rod 111. This rod 111 has a slot 112 to span the shaft 106 and at the lower end thereof is connected to an arm 113ª of a clutch dog 113. There are two clutch dogs or trips which are similarly constructed and operate in the same manner except that they operate alternately by reason of the position of the cams 108 and 109, said cams being each adapted to give two movements to the dogs during each revolution thereof, the purpose of having two dogs is that one or the other will always be in position to coöperate with the clutch so that there will be no possibility of the clutch failing to work properly to impart rotary movement to the shaft 72 and through said shaft the Geneva movement which rotates the brush holding turret 10. The clutch 73 is substantially the same as the main drive clutch 75 already described. In this case, Figs. 28 to 33, the disk or member 114 is keyed to a sleeve 115 and this sleeve has a key or groove connection with the shaft 72 to adapt the latter to have a lengthwise movement with the turret and at the same time the shaft is adapted through the sleeve to impart rotary movement to said shaft 72. A pulley 116 is independently driven and this pulley may be directly connected with the clutch or may be connected indirectly by means of gearing as preferred, and said pulley has teeth 117 which are adapted to be engaged by a dog 118. The dog 118 is normally pressed into engaging position by a spring 119 and disengaged by a spring-pressed pin 120 when the clutch member 121 on which the pin 120 and the lug or projection 122 is mounted and held stationary is moved by either of the dogs 113 engaging any one of the teeth 123 of disks 123ª which are held to rotate with said member 121. The shaft 72 is guided at the outer end in a frame bearing 124 and in the outer end of said frame 124 is a shaft or rod 125 about which the dogs 113 are adapted to rock. The shaft 125 as well as the shaft 122 is adapted to move lengthwise with the turret head and serve in a measure to guide said head in addition to the guiding means provided on the machine frame proper.

It will be evident from the foregoing that the turret is given a step-by-step movement to place the successive brushes over the drill 33 and as soon as the holes of one row have been drilled, a rotary movement will be imparted to the turret to position the brush blank to have the next row of holes and then a backward step-by-step movement given to the turret in such a way as to give an additional movement to the turret, also to position this row of holes made by the drill staggered with relation to the first row. When the second row is completed, a rotary movement is given to the turret for the third row and a similar number of steps is given to the turret in the opposite direction to make the same number of holes in the third row as in the second row. Rotary movement is then given to the turret for the fourth row, and in such a way that said fourth row will comprise a less number of holes and the said holes be staggered with relation to the third row. After the fourth row of holes has been made, a rotary movement of sufficient extent is given to the turret to remove one brush blank from out of the path of the drill and place another brush blank in position to be drilled at the same point of starting as the previous blank.

At each movement of the brush holding turret whether it is a step-by-step movement lengthwise of the turret head or a rotary movement, the drill 33 is operated so as to drill a hole for the reception of a tuft of bristles. Each hole made by the drill 33 is enlarged inwardly, Figs. 36ª, 43 and 44, so that the hole is larger at the bottom than at the face of the brush blank, the drill being so operated as to make the hole of this shape. The drill 33, Figs. 1, 6, and 34 to 38, has its shank held in a stem socket piece or holder 126 so that in case of breakage another drill may be readily placed in the holder. The holder 126 is detachably held in a chuck 127. This chuck 127 has a sleeve or tubular member 128 for the reception of the stem of the holder 126 and said member 128 forms a part of or is held to a vertically movable spindle 129. The spindle 129 has a threaded portion 130 which is engaged by the threaded end of the chuck sleeve or member 131. The chuck member 131 has a tapered part 132 and this tapered part when rotated to be moved along the rod or spindle 129 is adapted to move a dog or locking element 133 into engagement with a cut-away part of the inner member of the drill holder 126, said dog or locking member 133 being pivoted to rotate with the spindle 129. If the holder 126 is to be removed, the sleeve 131 is rotated so as to release the dog 133 and this will permit the holder to be removed while the reverse operation causes the dog 133 to lock the holder 126 to the chuck 127. The spindle 129 at its lower end is supported to rotate in the arm 134 of a bracket 135, there being collars 136 on opposite sides of the arm 134 to prevent relative lengthwise movement of the spindle 129. A pinion 137 is rotatably held in a bracket or arm 138 and has a spline-and-feather connection with the spindle 129 so as to rotate said spindle and at the same time permit vertical movement of the spindle. The gear or pinion 137 is in mesh with a gear or pinion 139 on a vertically arranged shaft or spindle 140. The shaft or spindle 140 is held to rotate in the arm 138 at one end and at the lower end is held to a rotary sleeve 141, the latter being held in the outer end of a bracket 142. The spindle 140 is arranged vertically and the spindle 129 is arranged at an angle with respect to the spindle 140 so that the axial line of each spindle will intersect substantially at the face of the brush blank to be drilled. The body of the spindle 129 is held to rotate in a bushing 143 and this bushing is adapted to rotate axially with respect to the spindle 140, and during such rotary movement will carry the spindle 129 with a sun-and-planet movement about the spindle 140, the bracket 138 also rotating with the bushing 143. If, therefore, a rotary movement is imparted to the bushing 143 and a rotary movement through the gears 137 and 139 given the spindle 129 and said spindle 129 move vertically as will be presently described, a rotary movement will be given to the drill 33. As the point of the drill at the face of the brush is in alinement with the axis of the bushing 143 and spindle 140, a round hole of the diameter of the drill will be made as the latter enters the face of the brush blank because the axial lines of the spindles 140 and 129 intersect at the face of the brush blank, and on further movement of the spindle 129 and drill, the axial lines cross so that the drill will have its path of movement enlarged and this movement increases as the elevation of the drill is increased, thus the hole or opening in the brush blank is enlarged at the bottom while at the entrance the opening or hole is of the size of the drill itself, the form of the opening being substantially that shown in Fig. 36ª. The upper end of the drill holder 126 is guided in a bracket 144 which is held to the bushing 143 and said bushing is rotatably held in an adjustable block or bearing 145. This block or bearing may be adjustable vertically by means of a screw 146, the head of which is held, at 147, to a part of the bracket 142 or frame and at the upper end is provided with a lock nut 148 and with a slot 149 for the reception of a screw driver or other means by which the screw or bolt 146 may be rotated to adjust the bearing 145, the purpose of this adjustment being to position the drill properly with respect to the face of the brush back or blank. The rotary movement of the spindle 140 may be obtained by a separate motor 150 from which extends a belt 151 which passes around a shaft or pulley 152 to adapt the spindle 140 to be rotated, though other means than the motor may be employed for this purpose. The vertical movement of the spindle 129 is given by means of a lever 153. This lever 153 may have a bifurcated end to engage between the shoulders 154 of a collar 155, said lever being normally forced downward by means of a spring 156. This lever 153 is pivoted, at 157, to the bracket 142 and at the outer end thereof carries a trundle or roll 158 which is engaged by a cam 159. The cam 159 is held to a shaft 160 and this shaft during the rotary movement thereof will cause the cam 159 to move the lever 153 and through said lever elevate the bracket 135 together with the spindle 129 and the drill carried thereby, at the same time permitting the spindle 129 to be rotated and also revolve about the spindle 140. The revolving movement of the spindle 129 about the spindle or shaft 140 is obtained by means of a gear 161 forming a part of or secured to the bushing 143, and meshing with said gear 161 is a gear 162. The gear 162 is held to rotate on a stud 163 and rotatable with said gear 162 is a smaller gear 164. The gear 164 is in mesh with a gear 165 on the vertical shaft 160 so that on the rotation of said shaft, the train of gears will cause a rotary movement to be imparted to the bushing 143. By this means the drill 33 which may be substantially the same as that employed by dentists or of any other suitable form is given a vertical movement as well as a rotary and revolving movement and in such a way as to countersink inwardly each hole by the same drill and during the same vertical movement of said drill so as to adapt the tufts of bristles when inserted in the hole to be guided properly at the entrance of the hole to retain the tuft in proper form and permitting the inner part of the tuft to spread and to be anchored within the hole against liability of detachment as will be presently described, the said action of the drill being timed so as to form a hole between each two movements of the brush holding turret.

The turret with the brush blank having the holes drilled by the mechanism already described, is given a partial rotary movement to move the brush blank away from said drilling mechanism. If a drill should become broken or if the drill failed to drill any one of the holes properly, it is desirable that the machine be stopped and the faulty brush blank removed from the machine before the brush blank reaches the position to receive the tufts of bristles. This result may be secured in various ways. As shown, I provide a detector mechanism 166, best shown in Figs. 6 and 39 to 47, which is timed to the movements of the drill, and as the drill is drilling a hole in one blank, the said detector mechanism is testing the corresponding hole in another blank. A pin or element 167 is adapted to enter each of the holes of the brush blank and said pin is formed on the end of a rod or shank 168. The rod 168 is held in lugs 169 of a vertical slide 170. This slide 170 is suitably guided on the bracket 142 and has a dovetailed portion 171 fitting a dovetailed groove in said bracket. A stud or rod 172 is held to the slide 170 and held to said rod is a collar 173 which is held in position on the rod 172 by a nut 174 or otherwise. A lever 175 is pivoted, at 176, and has one end or arm thereof provided with a roller 177 which is adapted to be engaged by a cam 178 arranged upon the rotary shaft 160, so that at each rotation of the shaft 160 a reciprocatory movement is given to the slide 170 and the pin or detector 167. The rod 168 carrying the detector pin 167 is independently slidable in the lugs 169 of the slide 170, the purpose being that when the hole is properly formed, the pin will move with the slide, but if the hole has been either improperly formed or not made at all, a vertical independent movement of the pin with respect to the slide will cause the machine to be automatically stopped. To secure this result, the rod 168 has a collar 179 secured thereto and this collar is normally pressed upward by a spring 180 so that the detector pin or detector 167 will normally move with the slide 170. A lever 181 is pivoted to the slide 170 to move with the same and one end of the lever 181 is bifurcated to span the reduced portion 182 of the collar 179 and at its other end it is provided with a bolt or screw 183 to provide an adjustable engaging means for said lever 181. An arm 184 is pivotally held to a stud 185 and said arm is arranged in the path of movement of the lever 181 and is held in its normal position by means of a spring 186. On the stud or pin 185 is a lever 187, the upper end of which has a step or shoulder 188 adapted to engage a lever 189. The lever 189 is normally forced in one direction by a spring 190, Fig. 40, and is held to a sleeve 190ᵃ which rocks on the shaft 78. At the other end of the lever 189 is a dog 191 which is adapted to be thrown into engagement with any one of the teeth 192 of a disk carried by the clutch member 94 of the main driving clutch 75, said teeth 192 varying in number as desired. The normal position of the dog 191 is disengaged from the teeth 192 so that when said dog engages any one of the teeth, it will hold the member 94 of the clutch stationary and thereby disengage the dog 88 from the ratchet teeth as already described, and thus stop the machine. The normal movement of the detector pin 167 corresponds to the movement of the drill 33 and if the detector 167 engages a blank portion of the brush blank, as shown in Figs. 41 and 44, the said pin 167 will be held against movement as the slide 170 is forced upward and this will cause the lever 181 to be rocked on its pivot throwing the outer end of the screw 183 into engagement with the arm 184. This will rock the lever 187 throwing the step or shoulder 188 out of engagement with the lever 189 allowing the spring 190 to force the dog 191 into the path of the teeth 192 of the clutch member 94, the machine being again started when the defect in the brush is corrected as by the removal of the defective brush as will be presently described. The handle 192ᵃ, Fig. 1, is adapted to restore the lever 189 with its dog 191 to its former or normal position by the spring 186 as soon as the hand lever 192ᵃ is pressed forward far enough for the pawl 191 to be disengaged from the teeth 192, at which time the bottom part of the slot in the lever 189 will strike the cross-bar 193 of the lever 187, said bar 193 serving as a guide for both levers on each other. The step 188 of the lever 187 will drop back under the lever 189 and thus hold the pawl 191 out of engagement with the teeth of the member 94, there being a relative independent movement between the two clutch dogs 77 and 191, one dog being moved by the hand lever 192ᵃ and detector mechanism, while the other is operated by the pedal 81.

The shaft 160 for the drill and detector mechanism may be rotated in any suitable manner. As shown, a gear 194 is held to the upper portion of the shaft 160 and said gear is in mesh with a train of horizontally arranged gears 195. The outer gear 195ᵃ of the train of gears 195 is held to the lower end of a vertically arranged shaft 196, said shaft being journaled in brackets 197 on the machine frame. At the upper end of the shaft 196 is a miter gear 198 and this gear is in mesh with a similar miter gear 199 arranged on a drive shaft 200. At the end of the shaft 200 opposite the gear 199 is a miter gear 201 which is in mesh with a similar gear 202 on the shaft 83, which latter shaft is operated through the main drive pulley 74 by means of the gears 76 and 82, thus the detector mechanism and the drilling mechanism are driven in sequence with each other and together with the operation of the brush holding turret moving mechanism.

In case a brush blank or back has been drilled improperly or a hole not drilled at all and by reason of which the machine has been stopped by the detector mechanism already described, it is desirable that provision be made to remove such brush blank from the turret before the blank reaches the point where it is to receive the tufts of bristles. For this purpose the disk or cam 28 about which the turret moves and which holds the jaws in position to grip the brush blank is held so as to have a slight rotary movement about the shaft 13, although said disk is normally stationary during the rotary movement of the turret. On the disk 28 is arranged a detachable section 203. This section comprises a block portion 204 which is dovetailed to fit a correspondingly shaped groove in the disk 28 and make the periphery of said disk continuous when in position and to leave an opening in said disk at the periphery thereof when the section is removed. A handle or gripping portion 205 extends outward from the block section 204 and pivotally held to the handle or member 205 is a dog 206. The dog 206 extends inward beyond the block 204 and is adapted to engage the rear edge of the disk 28. The dog 206 is extended outward to provide a handle 207 which is normally forced away from the handle portion 205 by a spring 208 so that when the handles are pressed together, the dog will be disengaged from the disk and the block or section 204 readily removed. or the said section readily inserted and held in position. The section 203 is normally opposite one of the rolls 27 for operating the movable jaw of the brush holding means so that to remove the section, the disk 28 is given a slight rotary movement to position the same between two of the rolls 27. The section may then be removed and when the disk 28 is returned to its normal position, the opening in the disk is then opposite the roll controlling the jaw for holding the faulty or defective brush blank so that the roll 27 by means of its spring will be forced into said opening and thus release the jaw permitting thereby the brush blank to be removed. The disk 28 is held to a sleeve and this sleeve at the outer end thereof is provided with an arm 209, Fig. 2. The arm 209 is connected by an adjustable rod 210 to a pedal 211, the said pedal being pivoted, at 212, to the machine frame and having a slotted projection 213 which is adapted to span a pin or stop 214 to position the pedal 211, there being a spring 211ª for restoring the pedal and holding the disk in its normal stationary position.

The description thus far refers to the means for holding the brush blanks or backs and preparing the same with the proper number of holes ready to receive the bristles and to position the brush blanks successively opposite the drilling mechanism, the detector mechanism and the mechanism for inserting the tufts or bristles into the different holes made by the drill 33. The operation of the parts thus far referred to will be readily understood from the foregoing description. The brush blanks held by the jaws are manually placed between the jaws 17 and 18 so as to be on the different faces of the turret head before the machine is started or the machine may be started after one or more of the brush blanks have been placed in position to be held by the sets of jaws, and while the machine is running, additional brush blanks may be placed and held on the turret. During the rotary movement of the turret, the lowermost blank is positioned over the drill 33 in which position the first hole of the first row is made in the brush blank by the drill mechanism already described. The turret is then moved lengthwise by the cam 38 through the ratchet and pawl mechanism with a step-by-step movement and at the end of each movement the drill is operated to make a hole and this continues until the entire first row of holes in the brush blank is made. A rotary movement is then given to the turret to place the blank in position for the next row, the turret having a step-by-step movement in the opposite direction given thereto and the drill operated to drill a hole each time the turret stops in its lengthwise movement. The number of movements of the turret during the forming of the holes for the second row is greater than the number of movements for the first row of holes and the action of the turret is such that the second row is staggered with relation to the first row. At the completion of the second row of holes, the turret is given a rotary movement to place the first hole of the third row in position over the drill 33 and after the hole is made, a lengthwise movement is given to the turret and this movement continues in a step-by-step manner until the third row is completed which corresponds in number to that of the second row. At the completion of the third row, the turret is given a partial rotation to place the blank in position for the fourth row of holes and the movement of the turret is such that this row of holes is of less number and staggered with relation to the third row of holes and arranged to correspond in number and position to the first row of holes. After the fourth row of holes is completed, the turret is given a greater movement so as to place a new brush blank in position to have the holes drilled therein and the one already drilled over the detector mechanism. The detector pin 167 is operated in sequence with the drill and is acting upon the blank already drilled while the drill 33 is making holes in a new blank. If a hole has not been drilled or has not been drilled to the proper depth, the detector pin will operate the mechanism in such a way as to stop the machine as already described, at which time and in case a brush blank has been defectively drilled, the said brush blank can be removed by the detachment of the section 203 from the disk 28 and the machine again started. This operation continues until the brush blanks reach the point where the filling of the holes with tufts of bristles is effected as will be described later, and this filling of the brush blanks with the bristles is accomplished while one blank is being drilled and another blank is being tested by the detector mechanism. After the brush has been filled with the tufts of bristles, the continued rotary movement of the turret 10 brings the uppermost filled brush or blank over the cut-away portion of the disk 28 which releases the clamping jaw 17 thereby permitting the filled brush to be removed and another blank placed in its stead.

The bristles are arranged horizontally in a hopper 215 and over the bristles may be arranged a follower 216 having a vertical stem 217 which is guided in a bracket 218 and at the upper end of the stem 217 is a weight 219, though instead of the weight a lever and spring connection may be provided tending normally to force the bristles downward. The hopper 215 is wider at the upper portion and narrows into a throat 220 and has one side thereof, as 221, pivoted so that it may be vibrated in order to assist in causing the bristles to be arranged properly for separation and for removal from the hopper. The side 221 is provided with a beveled block or engaging member 222 of a wedge-shaped form and said member 222 at the upper end thereof is held to a threaded stem 223. The stem 223 passes through a lug 224, Fig. 72, and on opposite sides of the lug and engaging the threads of the stem 223 are nuts 225 by which the stem may be adjusted and consequently the block or engaging member 222. A cam 226 is held to rotate with a shaft or rod 227 and this shaft is provided with a pinion 228, the teeth of which are adapted to be engaged by a rack or segment 229 held to have an oscillating movement on a shaft or rod 230. As the rack 229 oscillates, the shaft or rod 227 is given a rotary movement and this causes the cam 226 to move the side 221 of the hopper 215. This permits the side 221 to open the throat of the hopper wider while the separating points of the slide 231 are going through the bristles. This separating slide 231 is arranged immediately under the throat 232 of the hopper and is adapted to reciprocate back and forth and during the reciprocatory movement to separate the proper amount of bristles for one of the tufts from the mass within the hopper, there being an agitator, as 233, to assist in the proper manipulation of the bristles. The agitator is adapted to move up and down on a pivot or rod 234 during the reciprocatory movement of the slide 231, and said agitator comprises a plurality of spaced arms or fingers 235, Figs. 72, 84 and 85, the forward ends of which are sharpened and which lie normally directly under the throat 232. The slide 231, Figs. 70 to 83, is guided in a stationary frame 236 and on opposite sides thereof may have racks 237, the teeth of which are engaged by pinions 238 held to the rod or shaft 227 so as to move with said shaft, and during the rotary movement thereof, impart reciprocatory movement to the separating slide or member 231. As shown, the slide comprises two members 239 and 240 and said slide as well as the hopper may be arranged to handle bristles double the length needed for making an ordinary tuft, or the said hopper and slide as well as the means for handling the bristles may be made to handle bristles only enough to make a single tuft, the bristles in any case being long enough to permit trimming after the brush backs are filled. The purpose of handling bristles long enough for two tufts is that some waste is avoided in trimming of the brush as the long part of the bristles cut off in trimming a filled brush may be used for other brushes, the trimming being done independently of the machine shown herein. The slide member 239 has two bar-like parts 241 and 242 between which are three narrow and spaced bars or fingers 243, there being two flanges or ribs 244 which are spaced apart and correspond to the length of the bristles in the hopper. The forward portion of the slide member 239 between the two ribs 244 tapers downward, as at 245, and the member 240 of the slide is adapted to be held to move with the member 239. This member 240 is provided with a main separating needle 246 and with two shorter needles 247 located on opposite sides of and spaced from the main needle 246. There are two larger spaced members 248 on opposite sides of the shorter needles 247 and still shorter members 249 on opposite sides of the members 248. All of these members as well as the needles 246 and 247 have their penetrating point below the top surface of the plate or member and also have their lower surface beveled, as shown clearly in Fig. 80. When the two members 239 and 240 are brought together, a space is provided between the tapered or beveled part 245 of the member 239 and the members and needles of the member 240 so that during the reciprocation of the separating slide, the needle 246 will separate the proper number of bristles from the mass in the hopper and these separated bristles will fall or be carried into the space between the beveled portion of the member 239 and the member 240. During the forward movement the bristles are moved up and bunched against an abutment 250. This abutment is formed by two substantially triangular wings or plates 251 and two shorter wings or plates 251$^a$ which project upward between the needles 246 and 247 as well as the spaces between the members 243 of the slide, and said wings are adjustable with respect to the throat of the hopper as shown in Figs. 72 and 81 to 83. The fingers or wings 251 and 251$^a$ form a part of an adjustable member 252 of the fixed plate 253. The plate 253 lies directly under the slide and the abutment wings 251 are adjustable so as to place the abutment in the exact position desired. This adjustment may be accomplished by means of an overhanging portion 254 of the part to which the wings 251 and 251ª are held. An adjusting screw 255 passes through the overhanging portion 254 and by this the abutment wings can be moved back and forth, the inner end of the screw 255 engaging a part of the fixed plate 253.

The separated bristles are adapted to be received by transfer means and by said means carried to the mechanism whereby the separated bristles are folded upon themselves and formed into a tuft and by said mechanism inserted into a hole in the brush blank which has been previously presented by the movement of the turret 10 in position to receive the tufts of bristles. This transfer mechanism, Figs. 6, and 64 to 73, has jaws 257 and 258, said jaws 258 being relatively movable with respect to the jaws 257. The jaws 257 form a continuation of arms 259 to which the jaws 258 are pivoted, and said arms 259 are held to oscillate with the shaft 260. The shaft 260 carries a pinion 261 at one end and this pinion is in mesh with a reciprocatory rack 262. The rack 262 has a vertical movement by means of a rotary cam 263 so that as said cam rotates, the pinion 261 will be rotated and during said rotary movement will move the jaws from the position to receive the separated bristles, as shown in Fig. 6, to the transfer position or that shown in Figs. 70 and 72. The jaws 257 and 258 are arranged in pairs and said pairs are spaced apart and one of said jaws has a tooth to fit into a recess of the other jaw to grip more securely the separated bristles. The movable jaws 258 are connected together and are normally pressed toward the relatively fixed jaws by means of one or more springs 264. The movable jaws 258 are held to a shaft 265 and on one end of said shaft is an arm 266 while on the other end is an arm 267, said arms projecting in opposite directions and on opposite sides of the shaft 265. A sleeve 268, Fig. 73, is held to move independently about one end of the shaft 260 and at one end of the sleeve is an arm 269, the outer end of which carries a screw 270 which is adapted to be locked in an adjustable position by a nut 271. The end of the screw 270 is adapted to engage the arm 266 and open the movable jaws when said arm is moved and when in the position shown in Fig. 72 in order that the bunch of bristles for a tuft may be removed or discharged therefrom as will be presently described and when the jaws are in the position shown in Fig. 6 to receive the separated bristles, the jaws 258 have been opened by the engagement of the arm 267 on the shaft 265 against the end of a stop 272. The stop 272 is in the form of a rod having a thumb head 272ª for rotating said rod and a threaded portion to engage a threaded opening in a part of the frame or bracket 236 to permit adjustment of said rod, there being a nut to lock said rod in its adjusted position. An arm 273 is held to the sleeve 268 and a vertically arranged rod 274 is connected to said arm, said rod being provided with a trundle which is operated by a cam 274ª secured to the shaft 200. This cam 274ª and rod 274 at the proper time operates the arm 273 and through the sleeve 268 causes the screw 270 carried by the arm 269 to open the jaws 258 to discharge the bristles, and when the pinion 261 and rack 262 moves the jaws 258 and 257 to receiving position under the hopper and during such movement causes the jaws 258 to open by the engagement of the arm 267 with the stop 272.

The separated bristles carried by the jaws 257 and 258 during their movement from a substantially vertical position to a substantially horizontal one, are carried about the curved fingers or parts 275 of the plunger mechanism for forming the bristles into a tuft and for forcing the same as well as anchoring the tuft in the brush blank or back. The fingers 275, Figs. 6, and 54 to 57, are formed as continuations of a jaw 276, the latter being recessed to provide an opening for the passage of the tuft of bristles. The bristles as they are forced through the opening in the jaw 276 are doubled or folded upon themselves to provide a tuft ready to be forced into one of the holes in the brush back. The jaw 276 is formed as a part of arms 277 which are supported, at 278, on the inner ends of rods 279. The rods 279 are held in a slide 281 and are normally forced in one direction by means of springs 282, the latter being arranged around said rods and interposed between collars 283 on said rods and abutments 284 formed by cutting away a part of said slide 281. The plunger slide 281 is held to be reciprocated between the guides 285 which are secured to a bracket or part 286 of the machine frame. The slide 281 and the parts mounted to move therewith are arranged at an inclination so that the parts including the jaws 276 may move in alinement with the position of the brush back held by the brush holding turret and on substantially a line forming a radius with the axis of the turret as a center. The slide 281 has a part 287 which may be tapering or pointed at its inner end, as at 287ª, and in which a plunger 288 is held. The part 287 is pivoted, at 288ª, to a rod 289. The rod 289 passes through a block 291 which is pivoted to the forked arm of the lever 290, and said block 291 is adapted to engage the outer end of a spring 292 arranged around the rod so that when said arm 290 is moved, the slide 281 with the part 287 is forced inward and downward and owing to the spring 292, said arm 290 may continue to move after the slide 281 is stopped in its downward movement as will be presently described. The rod 289 is provided at its outer end with nuts 293 serving as means to cause the rod 289 to be positively moved outward when engaged by the block 291 held in the arm 290, said arm 290 being held to rock on the shaft 230. An eccentric is fixed to the shaft 200 and moves an eccentric strap 294, and this strap is connected to an arm 295 on a shaft or rod 296. A second arm 297 on said shaft 296 is connected by a link 298 to the arm 290 and imparts movement thereto when the eccentric operates the arm 295. The inward and downward movement of the slide 281 is limited by engagement with an adjustable block 299, Figs. 6, 54, 55 and 62. This stop 299 is engaged by a threaded rod 300 held to part of the frame 286 and on said threaded rod is a worm gear 301 which is engaged by a worm 302 on a shaft 303. This shaft 303 is provided at one end with a polygonal part 304, Fig. 62, by which the said rod may be adjusted and through the adjustment of said rod rotate the worm gear 301 and adjust the stop 299 so that when a part carried by the slide 281 engages said block, its downward movement will be limited, and owing to the spring 292 around the rod 289, the arm 290 may continue its movement without operating the slide. In this position of the slide 281 the jaws with the bristles have been moved against the face of the brush blank opposite the hole to receive the tuft of bristles and the tapered part or end 287ᵃ of the plunger holding part 287 is directly against the jaws 276.

The plunger 288 comprises a plurality of parts. The plunger proper 306 is of narrow bar-like form and has a body portion 307. The body portion 307 fits a socket in the end of a socket member 308. A screw 309 is held to the body 307 and has a portion thereof extending into a slot 310 in the socket member 308, and tending normally to push the body 307 downward is a spring 311, one end of which fits about a pin 312 in said socket member and the other end against the body portion 307. The socket member 308 extends outward through the part 287 of the slide and is held to a sleeve 313 by means of nuts 314. The sleeve 313 has links 315 pivoted thereto at one end and said links are pivoted, at 316, at their opposite ends to arms 317 held to the shaft 230. The arms 317 are held to the shaft 230 and pivoted to one of said arms is a rod 317ᵃ on which is a trundle, the latter being moved with the rod 317ᵃ by a cam 317ᵇ which is adapted to be rotated through the shaft 200. As the cam rotates, the arms 317 will be rocked and this will move the socket member 308. During the downward and inward movement of the plunger 288, the body portion 307 with the plunger proper 306 will pass out of the end 287ᵃ between the jaws 276 to fold the bristles upon themselves and form them into a tuft and said plunger will drive the tuft into one of the holes in the brush back.

To anchor the tufts after being forced into the opening, the plunger 288 is adapted to move backward to receive a metal anchoring piece which may be of a more or less soft metal as for example an alloy or any suitable metal. This anchoring metal is adapted to be fed in the form of a strip and cut off during the operation of the plunger the proper size and by the plunger forced into the hole over the tuft and the metal anchoring piece upset sufficiently to hold the tuft in the hole. The plunger first drives the tuft into the hole, then comes back and gets the metal piece and then drives said piece into the hole, though any other action of the plunger may be secured as desired. The metal in the form of a strip may be held on a reel 318, Figs. 6 and 63, and enters a guide 319, Fig. 57, and is automatically fed in and along said guide by mechanism to be presently described. At the inner end of the guide 319 is a cutter 320. This cutter, Figs. 57 to 60, is provided with an opening 321 in alinement with the guide 319, said opening 321 and the thickness of the cutter being just of a size to correspond to the length of the piece of anchoring metal. The upper edge 322 of the cutter 320 forms a cutting edge and the lower edge of the guide 319 forms another cutting edge so that when a relative movement is given to the cutter 320, the metal will be separated to correspond with the thickness of the cutter into which it has been fed. The cutter 320 has a bar-like portion 323 with a tapered or beveled end 324 and with an enlarged part 325. The enlarged part 325 is provided with an opening to fit about the plunger body 307 and is normally forced in one direction by means of a spring 326 which is interposed between the enlarged part and a washer 327 located at the bottom of the opening in the part 287. The cutter is moved by the sleeve portion or socket member 308 during the independent movement of the plunger and a distance sufficient to separate the metal. The separated metal is forced out of the opening by the incoming metal as it is fed inward so that when the plunger 306 is forced downward and inward to force the tuft of bristles into the hole, a piece of anchoring metal is cut off and then on the backward movement of the plunger to a point beyond the opening 321 of the cutter, the previously cut piece is fed out of the opening in the path of the plunger by the incoming metal from the reel and the next movement of the plunger forces the separated piece into the brush hole over the tufts and locks or anchors the same therein.

To feed the alloy or anchoring metal to the cutter and plunger, various means may be employed. As shown, two feed rolls 328 are mounted to move with the slide 281 and these feed rolls are held to shafts 329. The shafts 329 extend lengthwise of the slide and one is provided with a key 330 which passes through the pinion 331. This pinion 331 is rotatably supported in bearings of the block 299 so as to permit lengthwise movement independent of the shafts 329 and still cause said shafts to be rotated together with the feed rolls when said pinion is rotated. A gear 332 of a feed clutch mechanism 333 is in mesh with the pinion 331 and at each movement of said gear 332 a proper feed movement is imparted to the feed rolls and by the latter a proper amount of anchoring metal is fed in position to be cut off and positioned in the path of the plunger portion 306. The gear 332 forms a part of a clutch disk or drum 334 and this drum is adapted to be engaged by dogs 335 the ends of which enter notches in the hub of an arm 336. The dogs 335 have slots to span a part of the rim 334 and to engage frictionally therewith and said dogs are forced in one direction by means of springs 337, connected at one end to dogs 335 and at the other end to pins 338. The clutch as described is of a well-known type of friction drive means. The arm 336 is limited in its movement in one direction by an adjustable pin or screw 339 and is connected to a rod 340. The rod or link 340 is connected to one end of a lever 341. The lever 341 is pivoted, at 342, and is normally forced in one direction by a spring 343 and at one end is provided with a trundle 344 which is operated by a cam 345 on the shaft 200 so that as said cam rotates, the lever 341 will force the link 340 and arm 336 so as to operate the feed mechanism for the anchoring metal, the feeding of the metal being done by the cam while the spring 343 returns the lever as much of the movement of the cam as the adjusting screw 339 will permit.

After a row of tufts of bristles has been inserted in the brush back and the next row started to be filled with the bristles, it is desirable that the tuft of bristles immediately adjacent the hole to be filled be moved away from the incoming bristles so as not to interfere therewith. To effect this, I provide two movable spreader members or jaws 346, Figs. 6 and 48 to 52. This spreading means is arranged on the inner face of the bracket on which the slide and plunger mechanism are mounted and at substantially right angles thereto so that its movement will be across the face of the brush back. The spreader 346 comprises two members 347 and 348 which are pivoted, at 349, to a slide 350. The slide 350 is held to move up and down between the guides 351 on the bracket frame. The slide or cross-head 350 is provided with a trundle 352 which is adapted to be engaged by a cam 353 held to the upper end of the shaft 160, the latter serving also as a means for operating the drill and detector mechanisms. The slide 350 may be restored to its normal or downward position by either gravity or by a spring as preferred and in the normal position the spreader members 346 are closed as shown in Fig. 48. During the upward movement of the slide 350, the upper portion of the spreader will engage the bristles of the tufts previously set and push them out of the path of the plunger and bristles to be set; after the reception of the bristles by the hole being filled, it is necessary that the members 347 and 348 be moved apart to be free of the tuft just inserted. The members 347 and 348 form part of arms 354 which are normally forced toward each other on their pivots 349 by a spring 355. The arms 354 have extensions 356 on which are pins 357 between which is adapted to move the cam end 358 of a slide 359. The slide 359 is guided in a bracket 360 on the slide 350 and has an end 361 and is normally pressed downward by a spring 362. The end 361 is adapted to be engaged and operated by a cam 363 on the shaft 160, the cam 363 and the cam 353 being formed as a part of the same body 364. The cams 353 and 363 are so positioned with relation to each other that the cam 353 will force the slide 350 to spread the completed tuft of bristles away from the incoming tuft and then the cam 363 will open the spreading jaws 347 and 348 to permit the slide 350 to return to its normal position without interfering with the tuft just inserted.

The bristles and the feeding mechanism therefor as well as the plunger mechanism and the metal feeding mechanism should be separately controlled so that in starting the machine the bristle-feeding and anchoring mechanisms are not operated until the drilling mechanism has drilled a number of brushes and until the turret has brought a drilled blank in position to receive the bristles. The bristle-feeding and anchoring mechanisms are also separately controlled where a brush back or blank has to be removed from the turret because of faulty drilling as hereinbefore explained or for any other reason. As one means, we mount parts of the different mechanisms upon a sleeve 365 instead of directly upon the rotary shaft 200 and control the rotary movement of the sleeve 365 by means of a clutch 366, The clutch 366 comprises a clutch member 367 having teeth 368 and 369. When the teeth 369 are in engagement with the hub of the cam 274ª which is keyed to the shaft 200, the said sleeve 365 and the cams and other parts mounted thereon will rotate with the shaft 200, but when the clutch member 367 is moved into engagement with sockets 370 in the bracket 371, Fig. 71, the said clutch member and sleeve will be locked against rotary movement so that the shaft 200 may rotate independently thereof. The clutch member 367 is slidingly held on the sleeve 365 by means of a key 372 and is adapted to be moved along the sleeve by a hand lever 373. The hand lever 373 is pivoted, at 374, to the bracket 371 and has a grip portion 375, the latter having an end 376 which is adapted to hold the lever 373 in either of its adjusted positions.

The operation of the mechanism for holding and drilling as well as detecting defects in the brush backs or blanks has already been described. The operation and means for handling the bristles and for anchoring them in the holes of the brush backs or blanks will be understood, it is believed, from the drawings and the foregoing description. The bristles, as before stated, are held in the hopper and are separated by the separating slide 231 and the separated bristles received and held by the transfer jaws 257 and 258 and by the latter transferred into position to be acted on by the driving plunger. The plunger mechanism takes the bristles and moves them to a point adjacent one of the holes of the brush blank and bends or folds the bristles upon themselves and forces the formed bristles as a tuft into the hole. During the forcing of the bristles, a piece of anchoring metal is cut off and after forcing a tuft of bristles into a hole, the plunger is moved backward and then moved forward again to force the piece of anchoring metal into the hole and over the bristles and upset the same enough to effectively lock the bristles in the hole. During the anchoring of the bristles in the hole, the spreader jaws 347 and 348 have forced the bristles already anchored in the brush back away from the hole receiving the new tuft of bristles and said spreader mechanism has its jaws opened automatically to pass by the tuft of bristles just inserted. This operation of forcing the tufts of bristles into the brush back continues and is in sequence with the drilling and detector mechanisms and by the time that one completed brush back has been drilled another has been subjected to the detector mechanism and a third has been filled with the tufts of bristles and as the turret continues to rotate the completed brushes are carried to the top of the turret and there released by the clamping jaws because of the position of the cut out part of the disk 28 as already described.

Having thus described our invention, we claim as new and desire to secure by Letters Patent:—

1. In a brush-making machine, the combination of a turret having a plurality of faces, pairs of jaws on said faces, one of each of said jaws being relatively movable with respect to the other, a normally stationary disk having a cut-away part, jaw operating arms moved in one direction by said disk during the rotary movement of said turret, means for imparting a rotary movement and a longitudinal movement to said turret, means for giving a limited movement to the disk, a detachable section held to said disk, means for drilling holes in rows in the brush blanks in succession, and means for filling the holes with tufts of bristles.

2. In a brush-making machine, the combination of a turret having a plurality of faces, pairs of jaws on said faces, one of each of said jaws being relatively movable with respect to the other, a normally stationary disk having a cut-away part, jaw-operating arms moved in one direction by said disk during the rotary movement of said turret, means for imparting a rotary movement and a longitudinal movement to said turret, means for giving a limited movement to the disk, means for drilling holes in rows in the brush blanks in succession, and means for filling the holes with tufts of bristles.

3. In a brush-making machine, the combination of a turret having a plurality of faces, relatively movable jaws one with respect to the other, arranged in pairs on said faces, a normally stationary disk having a cut-away part, jaw-operating arms moved in one direction by said disk during the rotary movement of said turret to impart movement to one of each pair of jaws, means for imparting a rotary movement and a longitudinal movement to said turret, means for drilling holes in rows in the brush blanks in succession, and means for filling the holes with tufts of bristles.

4. In a brush-making machine, the combination of a turret having means to hold a number of brush blanks, means whereby the brush blanks may be readily inserted or removed, a worm gear, a worm engaging said gear, a Geneva movement for moving said worm and for imparting variable throws thereto, clutch-controlled means for giving movement to said Geneva movement, and means for imparting a step-by-step movement to the turret.

5. In a brush-making machine, the combination of a turret having means to hold a number of brush blanks, means whereby the brush blanks may be readily inserted or removed, a worm gear, a worm engaging said gear, a Geneva movement for moving said worm and for imparting throws thereto, clutch-controlled means for giving movement to said Geneva movement, and means for imparting a series of step-by-step movements to the turret.

6. In a brush-making machine, the combination of means for holding a plurality of brush blanks, means including a clutch for rotating the brush blank-holding means, a cam and ratchet and pawl mechanism for imparting variable step-by-step movements to the brush blank-holding means, means including a clutch for operating the ratchet and pawl mechanism, means whereby the first-mentioned clutch may be controlled through the operation of the ratchet and pawl mechanism, means for drilling holes in the brush blanks, and means for filling the holes with bristles and for anchoring the same in said holes.

7. In a brush-making machine, the combination of means for holding a plurality of brush blanks, means for rotating the brush blank holding means, ratchet and pawl mechanism for imparting lengthwise step-by-step movements to the brush blank holding means after each rotary movement of said holding means, certain of the step-by-step movements after one rotary movement differing in number from others, means for operating the ratchet and pawl mechanism, means whereby the first-mentioned means may be controlled through the operation of the ratchet and pawl mechanism, means for drilling holes in the brush blanks, and means for filling the holes with bristles.

8. In a brush-making machine, the combination of means for holding a brush blank, means for moving the holding means laterally, means for imparting lengthwise step-by-step movements to the brush blank holding means after each lateral movement of said holding means, means whereby the first-mentioned means may be controlled through the operation of the second-mentioned means, means for drilling holes in the brush blanks, and means for filling the holes with bristles.

9. In a brush-making machine, the combination of means for holding a plurality of brush blanks, means including a clutch for rotating the brush blank holding means, a cam operatively connected to the holding means, ratchet and pawl mechanism for imparting a variable step-by-step movement to the cam, means including a clutch for operating the ratchet and pawl mechanism, means whereby the first-mentioned clutch may be controlled through the operation of the ratchet and pawl mechanism, means for drilling holes in the brush blanks, and means for filling the holes with bristles and for anchoring the same in said holes.

10. In a brush-making machine, the combination of means for holding brush backs, means for forming holes therein, means for imparting lateral and lengthwise step-by-step movements to the brush backs, clutch mechanism controlling said brush back holding means, manually operated means for controlling the clutch to start or stop the machine, automatically operated means adapted to trip the clutch in case the holes in the brush backs are imperfectly made or not made at all, and means for filling the holes in the brush backs with bristles.

11. In a brush-making machine, the combination of means for holding brush backs, means for forming holes therein, clutch mechanism controlling said brush back holding means, manually operated means for controlling the clutch to start or stop the machine, automatically operated means adapted to trip the clutch in case the holes in the brush backs are imperfectly made or not made at all, and means for filling the holes in the brush backs with bristles.

12. In a brush-making machine, the combination of means for holding brush backs, means for forming holes therein, manually operated means to start or stop the machine, automatically operated means adapted to stop the machine in case the holes in the brush backs are imperfectly made or not made at all, and means for filling the holes in the brush backs with bristles.

13. In a brush-making machine, the combination of means for holding a brush back and for forming holes therein, a hopper having a throat and adapted to hold bristles, means for agitating the bristles in the hopper, a separating slide comprising two members each provided with beveled portions forming a separated space for the bristles, one of said members having a separating needle and spaced parts and the other member also provided with spaced parts, means for reciprocating the slide, means for positioning the separated bristles, and means for taking the separated bristles and forming the same into a tuft and forcing the said tuft into one of the holes of the brush back.

14. In a brush-making machine, the combination of means for holding a brush back and for forming holes therein, a hopper having a throat and adapted to hold bristles, means for agitating the bristles in the hopper, a separating slide comprising two members forming a separated space for the bristles, one of said members having a separating needle and spaced parts and the other member also provided with spaced parts, means for reciprocating the slide, means for positioning the separated bristles, and means for taking the separated bristles and forming the same into a tuft and forcing the said tuft into one of the holes of the brush back and for anchoring the tuft in said hole.

15. In a brush-making machine, the combination of means for holding a brush back and for forming holes therein, a hopper having a throat and adapted to hold bristles, means for agitating the bristles in the hopper, a separating slide comprising two members, one of said members having a separating needle and spaced parts and the other member also provided with spaced parts, means for reciprocating the slide, and means for taking the separated bristles and forming the same into a tuft and forcing the said tuft into one of the holes of the brush back.

16. In a brush-making machine, the combination of means for holding a brush back and for forming holes therein, a hopper having a throat and adapted to hold bristles, means for agitating the bristles in the hopper, a separating slide comprising two members each provided with overlapping beveled portions and having a separated space for the bristles, one of said members having a separating needle and spaced parts on opposite sides of said needle and the other member also provided with spaced parts, means for reciprocating the slide, and means for taking the separated bristles and forming the same into a tuft and forcing the said tuft into one of the holes of the brush back.

17. In a brush-making machine, the combination of means for holding brush backs and for forming holes therein, means for holding bristles and for separating the same, transfer means comprising rotary arms, jaws carried by said arms and adapted to open and close, means for oscillating said arms, two arms held to the movable jaws of the transfer means, a stop adapted to open said movable jaws when the latter are in the receiving position, mechanism for positively opening said jaws when the transfer means is in the delivering position, and means receiving the bristles from the transfer means and for forming the same into tufts and for driving the tufts one at a time into the holes in the brush backs.

18. In a brush-making machine, the combination of means for holding brush backs and for forming holes therein, means for holding bristles and for separating the same, transfer means comprising jaws adapted to open and close, two arms held to the movable jaws of the transfer means, a stop adapted to open said movable jaws when the latter are in the receiving position, mechanism for positively opening said jaws when the transfer means is in the delivering position, and means receiving the bristles from the transfer means and for forming the same into tufts and for driving the tufts into the holes in the brush backs and for anchoring the tufts in the holes.

19. In a brush-making machine, the combination of means for holding brush backs and for forming holes therein, means for holding bristles and for separating the same, transfer means comprising rotary arms, jaws carried by said arms and adapted to open and close, means for oscillating said arms, two arms held to the movable jaws of the transfer means, a stop adapted to open said movable jaws when the latter are in the receiving position, mechanism for positively opening said jaws when the transfer means is in the delivering position and means whereby the bristles from the transfer means may be forced into the holes in the brush backs.

20. In a brush-making machine, the combination of means for holding brush backs and for providing holes to receive tufts of bristles in said backs, feeding means for the bristles, a slide, a plunger movable with and independently of the slide, means for holding bristles and coöperating with the plunger to form a tuft and by the plunger adapted to be forced into the receiving means of the brush back, anchoring metal feeding means, and means whereby the plunger for anchoring the tuft in the brush back may move back after forcing a tuft into a hole and then forward again to force a piece of anchoring metal into a tuft-filled hole.

21. In a brush-making machine, the combination of means for holding brush backs and for providing means to receive tufts of bristles, feeding means for the bristles, means receiving the bristles and comprising two movable jaws and yieldingly held rods to which said jaws are pivoted, a slide in which said rods and jaws are mounted, means for reciprocating the slide, means for limiting the movement of the slide, a tubular holding part forming a part of the slide, a plunger comprising a plurality of yieldingly held members movable in said tubular portion of the slide, a cutter operatively connected to the plunger and adapted to be operated thereby, said cutter having an opening, means for feeding a metal strip in said opening in the cutter to adapt the cutter to cut a piece therefrom, and means for operating the plunger whereby the bristles may first be doubled to form a tuft and inserted into the receiving means of the brush back, the plunger then moved backward and afterward forward to force the cut-off part of the metal over the tuft to anchor the same, and lastly back to its normal position.

22. In a brush-making machine, the combination of means for holding brush backs and for providing means to receive tufts of bristles, feeding means for the bristles, means receiving the bristles and comprising two movable jaws and yieldingly held rods to which said jaws are pivoted, a slide in which said rods and jaws are mounted, means for reciprocating the slide, means for limiting the movement of the slide, a tubular holding part forming a part of the slide, a plunger, and means for operating the plunger whereby the bristles may first be doubled to form a tuft and inserted into the receiving means of the brush back and the plunger then moved backward and afterward forward to force the cut-off part of the metal over the tuft to anchor the same, and lastly back to its normal position.

23. In a brush-making machine, the combination of means for holding brush backs and for providing holes to receive tufts of bristles, feeding means for the bristles, means for receiving the bristles, a slide in which said receiving means are mounted, means for reciprocating the slide, means for limiting the movement of the slide, a tubular holding part forming a part of the slide, a plunger comprising a plurality of yieldingly held members movable in said tubular portion of the slide, a cutter operatively connected to the plunger and adapted to be operated thereby, said cutter having an opening, means for feeding a metal strip in said opening in the cutter to adapt the cutter to cut a piece therefrom, and means for operating the plunger whereby the bristles may first be doubled to form a tuft and inserted into the receiving means of the brush back and the plunger then moved backward and afterward forward to force the cut-off part of the metal over the tuft to anchor the same, and lastly back to its normal position.

24. In a brush-making machine, the combination of means for holding brush backs and for providing holes to receive tufts of bristles, feeding means for the bristles, means receiving the bristles and comprising two movable jaws and yieldingly held rods to which said jaws are pivoted, a slide in which said rods and jaws are mounted, means for reciprocating the slide, a plunger, and means for reciprocating the plunger to force the bristles into the holes.

25. In a brush-making machine, the combination of means for holding brush backs, means for providing bristle receiving means in said brush backs, means for feeding separated bristles, an angularly arranged slide, means for yieldingly forcing the slide in one direction, a block for determining the movement of the slide in one direction, a plunger mounted in the slide, said plunger being arranged within a tubular portion of the slide, means for supporting bristles adjacent to the end of the tubular portion of the slide to adapt the plunger to force the bristles into the receiving means of the brush back, means for feeding a metal anchoring piece to the plunger, and means for giving two movements to the plunger to one movement of the slide to adapt the plunger first to force the bristles into the brush backs and then to move backward and force the piece of anchoring metal over the tufts of bristles to anchor the same in the brush backs and then return to its normal position.

26. In a brush-making machine, the combination of means for holding brush backs, means for drilling rows of holes in the brush backs, means for feeding separated bristles, an angularly arranged slide, means for forcing the slide in one direction, a plunger mounted in the slide, means for supporting bristles adjacent to the end of the tubular portion of the slide to adapt the plunger to force the bristles into the receiving holes of the brush back, means for feeding a metal anchoring piece to the plunger, and means for giving two movements to the plunger to one movement of the slide to adapt the plunger to first force the bristles into the brush backs and then to move backward and force the piece of anchoring metal over the tufts of bristles to anchor the same in the brush backs and then return to its normal position.

27. In a brush-making machine, the combination of means for holding brush backs, means for forming holes in the brush backs, means for feeding bristles, plunger mechanism including a slide and a plunger, means for holding the bristles to be acted upon by said plunger and by the latter forced into the holes, a block, a screw for adjusting said block, a worm gear held to said screw, a worm meshing with said worm gear, means for rotating said worm to permit adjustment of the block to determine the extent of movement of the slide in one direction, and means for feeding metal anchoring material to the plunger to be forced thereby into the holes to anchor the bristles therein.

28. In a brush-making machine, the combination of means for holding brush backs, means for forming holes in the brush backs, means for feeding bristles, plunger mechanism including a slide and a plunger, means for holding the bristles to be acted upon by said plunger, a block, a screw for adjusting said block, a worm gear held to said screw, a worm meshing with said worm gear, and means for rotating said worm to permit adjustment of the block to determine the extent of movement of the slide in one direction.

29. In a brush-making machine, the combination of means for holding brush backs, means for forming holes in said backs, means for feeding bristles, plunger mechanism including a plunger for forcing the bristles into the holes, means for holding the bristles to be acted upon by said plunger, a block, and means to permit adjustment of the block to determine the extent of movement of the slide in one direction, and means for feeding metal anchoring material to the plunger to be forced thereby into the holes to anchor the bristles therein.

30. In a brush-making machine, the combination of means for holding brush backs, means for forming rows of holes in said brush backs, means for feeding bristles, plunger mechanism for forcing the bristles into the holes of the brush backs, spreader jaws for forcing the previously inserted bristles out of the path of incoming bristles, together with means for opening and closing the jaws and for reciprocating the same.

31. In a brush-making machine, the combination of means for holding brush backs and for filling the same with bristles, a slide, jaws pivotally held to said slide, a spring normally forcing the jaws together, independently movable means mounted on the slide for opening the jaws, together with means for reciprocating the slide to adapt the jaws to move the bristles already inserted out of the path of the incoming bristles and then open to pass by the bristles just inserted.

This specification signed this fifteenth day of May A. D. 1915.

BENJAMIN W. TUCKER.
LUCIEN H. ARNOLD.